(12) United States Patent
Teraya et al.

(10) Patent No.: US 9,815,452 B2
(45) Date of Patent: Nov. 14, 2017

(54) HYBRID VEHICLE, CONTROLLER FOR HYBRID VEHICLE, AND CONTROL METHOD FOR HYBRID VEHICLE WITH TWO STAGES CATALYST WARM-UP IN RELATIONSHIP WITH VARIABLE INTAKE VALVE TIMING

(71) Applicant: TOYOTA JIDOSHA KABUSHIKI KAISHA, Toyota, Aichi-ken (JP)

(72) Inventors: Ryuta Teraya, Susono (JP); Toshikazu Kato, Toyota (JP); Yoshikazu Asami, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/102,054

(22) PCT Filed: Dec. 10, 2014

(86) PCT No.: PCT/IB2014/002725
§ 371 (c)(1),
(2) Date: Jun. 6, 2016

(87) PCT Pub. No.: WO2015/092510
PCT Pub. Date: Jun. 25, 2015

(65) Prior Publication Data
US 2016/0304083 A1    Oct. 20, 2016

(30) Foreign Application Priority Data
Dec. 19, 2013    (JP) .................................. 2013-262406

(51) Int. Cl.
*B60W 20/00*    (2016.01)
*B60W 10/00*    (2006.01)
(Continued)

(52) U.S. Cl.
CPC ............... *B60W 20/16* (2016.01); *B60K 6/24* (2013.01); *B60K 6/442* (2013.01); *B60W 10/06* (2013.01);
(Continued)

(58) Field of Classification Search
CPC .... B60W 10/00; B60W 20/00; B60W 20/166; B60K 6/00; B60K 6/24; B60K 6/442
See application file for complete search history.

(56) References Cited

U.S. PATENT DOCUMENTS 7,146,966 B2 * 12/2006 Nakamura ............... F01L 1/185
                                                    123/198 DB
7,357,101 B2 *  4/2008 Boyarski ............ F02M 25/0228
                                                      123/1 A
(Continued)

FOREIGN PATENT DOCUMENTS

JP          9-242519        9/1997
JP          2002-130030     5/2002
(Continued)

*Primary Examiner* — Yonel Beaulieu
(74) *Attorney, Agent, or Firm* — Finnegan, Henderson, Farabow, Garrett & Dunner, LLP

(57) ABSTRACT

A hybrid vehicle includes an electric motor, an internal combustion engine, an exhaust emission control device and a controller. The controller is configured to execute catalyst warm-up control for warming up a catalyst of the exhaust emission control device. The catalyst warm-up control includes first control and second control. The first control is control for operating the internal combustion engine at a first operating point. The second control is control for, after the first control is executed, operating the internal combustion engine at a second operating point irrespective of a driving force that is required to propel the hybrid vehicle. An output of the internal combustion engine at the second operating point is larger than an output of the internal combustion engine at the first operating point. The controller is config-
(Continued)

ured to operate the internal combustion engine while an ignition timing of the internal combustion engine at the time when the first control is executed is set to a retarded side with respect to an ignition timing of the internal combustion engine at the time when the second control is executed. The controller is configured to, when the first control is executed, control the variable valve actuating device such that the operation characteristic becomes the first characteristic. The controller is configured to, when the second control is executed, control the variable valve actuating device such that the operation characteristic is changed to the second characteristic. The controller is configured to, after the second control is executed, operate the internal combustion engine on the basis of the driving force that is required to propel the hybrid vehicle and control the variable valve actuating device on the basis of a rotation speed and torque of the internal combustion engine.

11 Claims, 22 Drawing Sheets

(51) Int. Cl.
| | | |
|---|---|---|
| B60K 6/00 | (2006.01) | |
| B60W 20/16 | (2016.01) | |
| B60W 10/06 | (2006.01) | |
| B60K 6/24 | (2007.10) | |
| B60K 6/442 | (2007.10) | |

(52) U.S. Cl.
CPC ..... B60Y 2200/92 (2013.01); B60Y 2300/182 (2013.01); B60Y 2300/437 (2013.01); B60Y 2300/474 (2013.01); Y02T 10/18 (2013.01); Y02T 10/6234 (2013.01); Y02T 10/6239 (2013.01); Y02T 10/6295 (2013.01); Y02T 10/7077 (2013.01); Y10S 903/905 (2013.01); Y10S 903/93 (2013.01)

(56) References Cited

U.S. PATENT DOCUMENTS

| | | | | |
|---|---|---|---|---|
| 7,520,260 | B2* | 4/2009 | Nakamura | F01N 3/035 |
| | | | | 123/299 |
| 7,584,740 | B2* | 9/2009 | Boyarski | F02M 25/0228 |
| | | | | 123/304 |
| 7,647,916 | B2* | 1/2010 | Leone | F02M 26/01 |
| | | | | 123/25 E |
| 9,090,251 | B2* | 7/2015 | Watanabe | B60W 10/06 |
| 9,303,581 | B2* | 4/2016 | Glugla | F02D 41/3094 |
| 2004/0118367 | A1 | 6/2004 | Ezaki et al. | |
| 2006/0037578 | A1* | 2/2006 | Nakamura | F01L 1/185 |
| | | | | 123/198 F |
| 2007/0074702 | A1* | 4/2007 | Nakamura | F01N 3/035 |
| | | | | 123/299 |
| 2007/0084425 | A1 | 4/2007 | Hirose et al. | |
| 2007/0119412 | A1* | 5/2007 | Leone | F02M 26/01 |
| | | | | 123/295 |
| 2008/0210207 | A1* | 9/2008 | Boyarski | F02M 25/0228 |
| | | | | 123/575 |
| 2012/0132163 | A1 | 5/2012 | Shoji et al. | |
| 2013/0204478 | A1* | 8/2013 | Watanabe | B60W 10/06 |
| | | | | 701/22 |
| 2015/0075492 | A1* | 3/2015 | Glugla | F02D 41/3094 |
| | | | | 123/349 |
| 2017/0009667 | A1* | 1/2017 | Asami | B60W 10/06 |

FOREIGN PATENT DOCUMENTS

| | | |
|---|---|---|
| JP | 2004-183610 | 7/2004 |
| JP | 2007-113413 | 5/2007 |
| JP | 2008-25550 | 2/2008 |
| JP | 2009-108720 | 5/2009 |
| JP | 2011-99399 | 5/2011 |
| JP | 2011-162077 | 8/2011 |
| JP | 2011-236758 | 11/2011 |
| JP | 2012-40915 | 3/2012 |
| JP | 2012-71664 | 4/2012 |
| JP | 2012-117376 | 6/2012 |
| JP | 2012-158303 | 8/2012 |
| JP | 2013-53610 | 3/2013 |

* cited by examiner

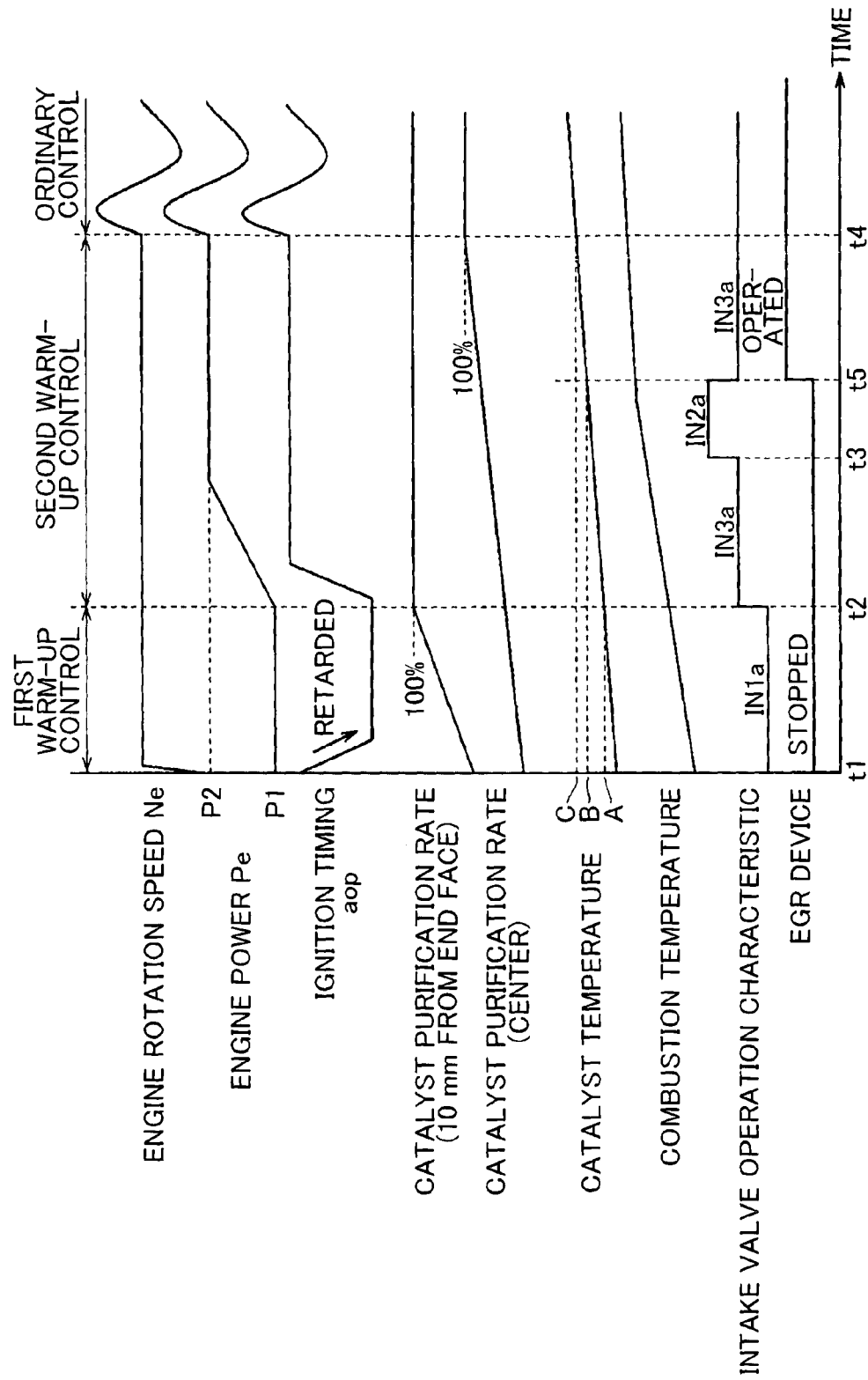

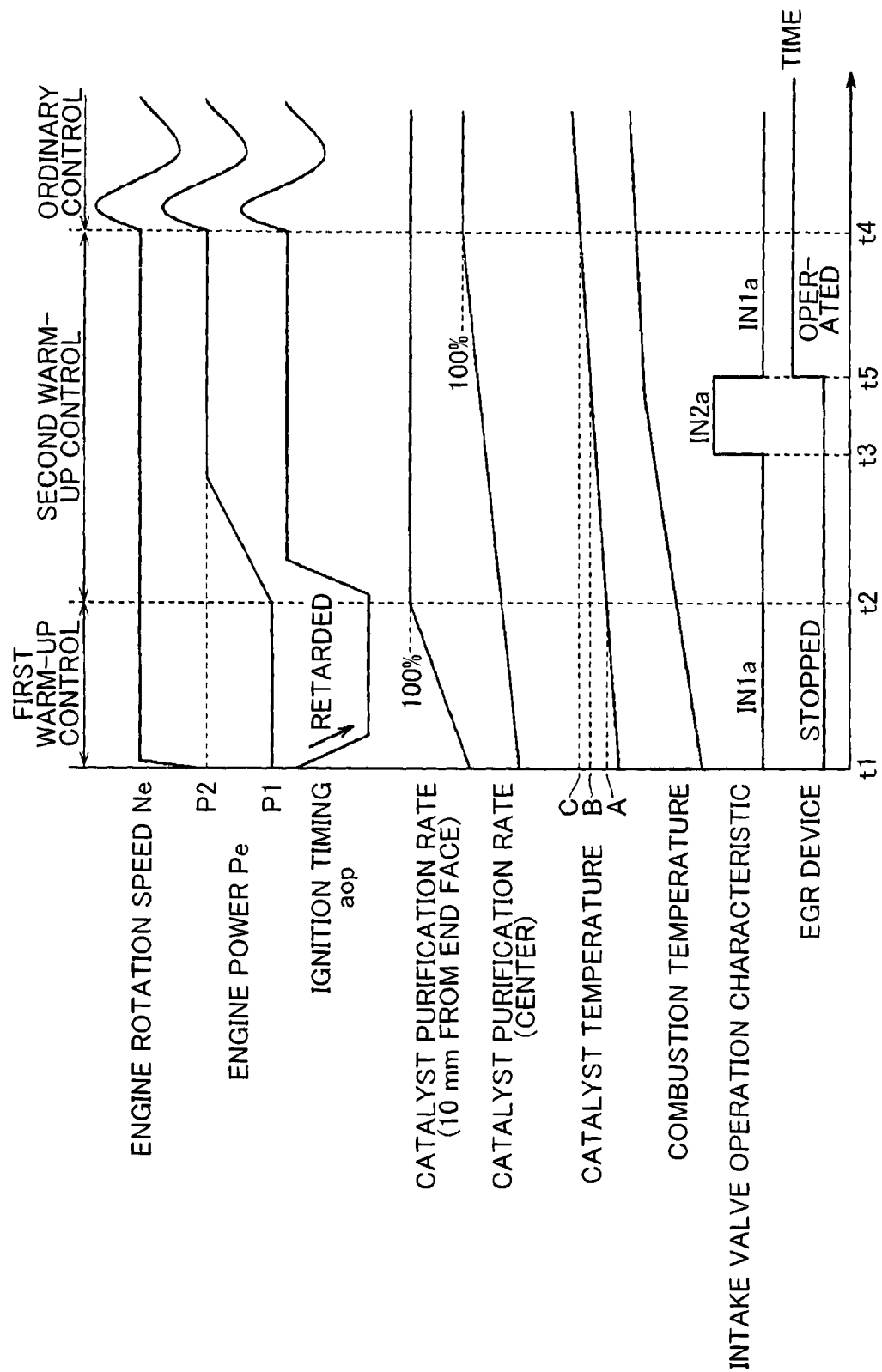

HYBRID VEHICLE, CONTROLLER FOR HYBRID VEHICLE, AND CONTROL METHOD FOR HYBRID VEHICLE WITH TWO STAGES CATALYST WARM-UP IN RELATIONSHIP WITH VARIABLE INTAKE VALVE TIMING

CROSS-REFERENCE TO RELATED APPLICATIONS

This application is a national phase application of International Application No. PCT/162014/002725, filed Dec. 10, 2014, and claims the priority of Japanese Application No. 2013-262406, filed Dec. 19, 2013, the content of both of which is incorporated herein by reference.

BACKGROUND OF THE INVENTION

1. Field of the Invention

The invention relates to a hybrid vehicle, a controller for a hybrid vehicle, and a control method for a hybrid vehicle and, more particularly, to a hybrid vehicle that includes an internal combustion engine including a variable valve actuating device for changing the operation characteristic of an intake valve, a controller for the hybrid vehicle, and a control method for the hybrid vehicle.

2. Description of Related Art

In order to purify exhaust gas from an internal combustion engine, an exhaust emission control device including a catalyst is used. To cause the catalyst to sufficiently exercise a purification function, it is required to increase the temperature of the catalyst.

For example, Japanese Patent Application Publication No. 2012-40915 (JP 2012-40915 A) describes a hybrid vehicle in which catalyst warm-up control is executed. In the catalyst warm-up control, a catalyst of an exhaust emission control device is warmed up. In this hybrid vehicle, when warm-up of the catalyst is required, initially, an internal combustion engine is operated at a first operating point at which the ignition timing of the internal combustion engine is retarded, the ignition timing is returned after the temperature of a catalyst end has increased, and then the internal combustion engine is operated at a second operating point at which an output required of the internal combustion engine is fixed. When warm-up of the catalyst has completed, the internal combustion engine is shifted into ordinary operation in which the output required of the internal combustion engine is changed on the basis of an output required of the vehicle as a whole (see JP 2012-40915 A).

There is also known an internal combustion engine including a variable valve actuating device that is able to change the operation characteristic of an intake valve. There is also known a variable valve actuating device that is able to change at least one of the valve lift or valve operating angle of an intake valve as such a variable valve actuating device (see Japanese Patent Application Publication No. 2009-108720 (JP 2009-108720 A), Japanese Patent Application Publication No. 2004-183610 (JP 2004-183610 A), Japanese Patent Application Publication No. 2013-53610 (JP 2013-53610 A), Japanese Patent Application Publication No. 2008-25550 (JP 2008-25550 A), Japanese Patent Application Publication No. 2012-117376 (JP2012-117376 A), Japanese Patent Application Publication No. 9-242519 (JP 9-242519 A), and the like).

For example, JP 2009-108720 A describes an internal combustion engine including a variable valve actuating mechanism that is able to change the valve lift of each intake valve. In this variable valve actuating mechanism, when warm-up of a catalyst is required, the open timing of each intake valve is retarded, and the valve lift of each intake valve is reduced. Thus, it is possible to stabilize combustion of the internal combustion engine during warm-up of the catalyst (see JP 2009-108720 A).

SUMMARY OF THE INVENTION

In the hybrid vehicle described in JP 2012-40915 A, at the first operating point and at the second operating point at which the output (Pe) required of the internal combustion engine is fixed after the ignition timing is returned, Pe is set to a small value irrespective of a traveling power that is required to propel the hybrid vehicle so as not to exceed a purification ability of the catalyst during warm-up. Therefore, fuel economy and emissions in exhaust gas tend to deteriorate as compared to those during ordinary operation after completion of warm-up of the catalyst.

The internal combustion engine described in JP 2009-108720 A stabilizes combustion of the internal combustion engine during warm-up of the catalyst by retarding the open timing of each intake valve and reducing the valve lift of each intake valve during warm-up of the catalyst, thus improving emissions. However, improvement in fuel economy is not particularly considered. Particularly, it is a task to improve fuel economy together with emissions in exhaust gas during catalyst warm-up control that is described in JP 2012-40915 A and that can be executed in a hybrid vehicle.

The invention provides a hybrid vehicle that is able to improve fuel economy and emissions during catalyst warm-up control, a controller for the hybrid vehicle, and a control method for the hybrid vehicle.

An aspect of the invention provides a hybrid vehicle. The hybrid vehicle includes an electric motor, an internal combustion engine, an exhaust emission control device and a controller. The electric motor is configured to generate a vehicle driving force. The internal combustion engine includes a variable valve actuating device. The variable valve actuating device is configured to change an operation characteristic of an intake valve. The variable valve actuating device is configured to change the operation characteristic of the intake valve to one of a first characteristic and a second characteristic. At least one of a valve lift or valve operating angle of the intake valve at the time when the operation characteristic is the second characteristic is larger than the corresponding at least one of the valve lift or valve operating angle of the intake valve at the time when the operation characteristic is the first characteristic. The exhaust emission control device is configured to purify exhaust gas from the internal combustion engine with the use of a catalyst. The controller is configured to execute catalyst warm-up control for warming up the catalyst of the exhaust emission control device. The catalyst warm-up control includes a first control and a second control. The first control is control for operating the internal combustion engine at a first operating point. The second control is control for, after the first control is executed, operating the internal combustion engine at a second operating point irrespective of a driving force that is required to propel the hybrid vehicle. An output of the internal combustion engine at the second operating point is larger than an output of the internal combustion engine at the first operating point. The controller is configured to operate the internal combustion engine while an ignition timing of the internal combustion engine at the time when the first control is executed is set to a retarded side than an ignition timing of the internal combustion engine at the time when the second control is executed. The controller is configured to, when the first control is executed, control the variable valve actuating device such that the operation characteristic becomes the first characteristic. The controller is configured to, when the second control is executed, control the variable valve actuating device such that the operation characteristic is changed to the second characteristic. The controller is configured to, after the second control is executed, operate the internal combustion engine on the basis of the driving force that is required to propel the hybrid vehicle and control the variable valve actuating device on the basis of a rotation speed and torque of the internal combustion engine.

When the operation characteristic of the intake valve is the first characteristic, at least one of the valve lift or valve operating angle of the intake valve is relatively small. Therefore, combustion is improved as a result of facilitation of disturbance of intake air in a cylinder, so emissions in exhaust gas are suppressed. In this hybrid vehicle, during execution of the first control, the operation characteristic of the intake valve becomes the first characteristic, so emissions in exhaust gas are improved. When the operation characteristic of the intake valve is the second characteristic, at least one of the valve lift or valve operating angle of the intake valve is relatively large. Therefore, fuel economy is improved as a result of the fact that the internal combustion engine runs on the Atkinson cycle. In this hybrid vehicle, by changing the operation characteristic to the second characteristic during execution of the second control, fuel economy is improved. Thus, with this hybrid vehicle, it is possible to improve fuel economy and emissions during the catalyst warm-up control.

The "output of the internal combustion engine" in the above description may be a power of the internal combustion engine or may be a torque of the internal combustion engine. The "driving force that is required to propel the hybrid vehicle" in the above description may be a traveling power or may be a traveling torque.

In the above aspect, the internal combustion engine may include a circulation device. The circulation device may be configured to circulate exhaust gas from the internal combustion engine to an intake side. The controller may be configured to, when the second control is executed, operate the circulation device.

When the circulation device is operated, combustion becomes slow. In this hybrid vehicle, when the second control is executed, it is not required to operate the internal combustion engine in response to the traveling power, so slow combustion resulting from the operation of the circulation device is allowed. Therefore, when the second control is executed, the circulation device is placed in an operable condition. Therefore, with this hybrid vehicle, the circulation device is operated during execution of the second control, so it is possible to further improve fuel economy.

In the above aspect, the controller may be configured to, when the second control is executed, when the circulation device is operated and when the operation characteristic of the intake valve is the second characteristic, control the variable valve actuating device such that at least one of the valve lift or valve operating angle of the intake valve decreases.

When the operation characteristic of the intake valve is the second characteristic during the operation of the circulation device, a combustion state deteriorates, so emissions can deteriorate. With this hybrid vehicle, at least one of the valve lift or valve operating angle of the intake valve is reduced in such a case. Therefore, it is possible to suppress deterioration of emissions while obtaining the effect of improving fuel economy resulting from the operation of the circulation device.

In the above aspect, the variable valve actuating device may be configured to selectively change the operation characteristic to any one of the first characteristic, the second characteristic and a, third characteristic. At least one of the valve lift or the valve operating angle at the time when the operation characteristic is the third characteristic may be larger than the corresponding at least one of the valve lift or the valve operating angle at the time when the operation characteristic is the first characteristic, and at least one of the valve lift or the valve operating angle at the time when the operation characteristic is the third characteristic may be smaller than the corresponding at least one of the valve lift or the valve operating angle at the time when the operation characteristic is the second characteristic. The controller may be configured to, when execution of the second control is started, control the variable valve actuating device such that the operation characteristic of the intake valve is changed to the third characteristic. The controller may be configured to, when the second control is executed, control the variable valve actuating device such that the operation characteristic of the intake valve is changed to the second characteristic. The controller may be configured to, when the circulation device is operated and when the operation characteristic of the intake valve is the second characteristic, control the variable valve actuating device such that the operation characteristic of the intake valve is changed to the third characteristic, and operate the circulation device.

With this hybrid vehicle, the operation characteristic of the intake valve is changed to the third characteristic, and the circulation device is operated. Therefore, it is possible to suppress deterioration of emissions while obtaining the effect of improving fuel economy resulting from the operation of the circulation device.

In the above aspect, the variable valve actuating device may be configured to selectively change the operation characteristic to any one of the first characteristic, the second characteristic and a third characteristic. At least one of the valve lift or the valve operating angle at the time when the operation characteristic is the third characteristic may be larger than the corresponding at least one of the valve lift or the valve operating angle at the time when the operation characteristic is the first characteristic, and at least one of the valve lift or the valve operating angle at the time when the operation characteristic is the third characteristic may be smaller than the corresponding at least one of the valve lift or the valve operating angle at the time when the operation characteristic is the second characteristic. The controller may be configured to, when execution of the second control is started, control the variable valve actuating device such that the operation characteristic of the intake valve is changed to the third characteristic. The controller may be configured to, when the second control is executed, control the variable valve actuating device such that the operation characteristic of the intake valve is changed to the second characteristic.

With this hybrid vehicle, it is possible to change the operation characteristic of the intake valve to any one of the first to third characteristics. Therefore, in comparison with the case where it is possible to change the operation characteristic in two steps, it is possible to further divide the setting of the operation characteristic, so it is possible to further appropriately improve fuel economy and emissions.

In the above aspect, the variable valve actuating device may be configured to selectively change the operation characteristic of the intake valve to one of the first characteristic and the second characteristic. The controller may be configured to, before execution of the second control completes, control the variable valve actuating device such that the operation characteristic of the intake valve is changed to the second characteristic.

With this hybrid vehicle, the operation characteristic of the intake valve is changeable in two steps. Therefore, it is possible to reduce a time that is required to adapt control parameters for controlling the operating state of the internal combustion engine. In addition, it is possible to reduce torque that is required of the actuator for changing the operation characteristic of the intake valve, so it is possible to reduce the size and weight of the actuator. The manufacturing cost of the actuator can also be reduced.

In the above aspect, the first control may be control for warming up an exhaust gas upstream side of the catalyst. The second control may be control for warming up the entire catalyst.

In the above aspect, the controller may be configured to, when any one of a first execution condition to a fifth execution condition is satisfied, control the variable valve actuating device such that the operation characteristic of the intake valve is changed to the second characteristic. The first execution condition may be satisfied after execution of the second control is started. The second execution condition may be satisfied after completion of return of the ignition timing resulting from a change from the first control to the second control. The third execution condition may be satisfied after completion of a change of the operating point from the first operating point to the second operating point. The fourth execution condition may be satisfied when a temperature of the exhaust emission control device has increased to a predetermined temperature. The fifth execution condition may be satisfied after it is determined that a combustion state of the internal combustion engine becomes stable.

In the above aspect, the controller may be configured to, when the first control and the second control are executed, control the electric motor such that the electric motor outputs a driving force that is required to propel the hybrid vehicle.

In this hybrid vehicle, the hybrid vehicle travels by using the electric motor during execution of the catalyst warm-up control. Therefore, warm-up of the catalyst of the exhaust emission control device is appropriately carried out through the first control and the second control without any response to the traveling driving force. With this hybrid vehicle, the operation characteristic of the intake valve is adjusted in accordance with the first control or the second control. Thus, it is possible to improve fuel economy and emissions during the catalyst warm-up control.

Another aspect of the invention provides a controller for a hybrid vehicle. The hybrid vehicle includes an electric motor, an internal combustion engine and an exhaust emission control device. The electric motor is configured to generate a vehicle driving force. The internal combustion engine includes a variable valve actuating device. The variable valve actuating device is configured to change an operation characteristic of an intake valve to one of a first characteristic and a second characteristic. At least one of a valve lift or valve operating angle of the intake valve at the time when the operation characteristic is the second characteristic is larger than the corresponding at least one of the valve lift or valve operating angle of the intake valve at the time when the operation characteristic is the first characteristic. The exhaust emission control device is configured to purify exhaust gas from the internal combustion engine with the use of a catalyst. The controller includes first warm-up control means, second warm-up control means and ordinary control means. The first warm-up control means operates the internal combustion engine at a first operating point, and operates the internal combustion engine while an ignition timing of the internal combustion engine at the time when the internal combustion engine is operated at the first operating point is controlled to a retarded side than an ignition timing of the internal combustion engine at the time when the internal combustion engine is operated at a second operating point. The first warm-up control means controls the variable valve actuating device such that the operation characteristic of the intake valve becomes the first characteristic. The second warm-up control means operates the internal combustion engine at the second operating point, and controls the variable valve actuating device such that the operation characteristic is changed to the second characteristic. The ordinary control means, after the control is executed by the second warm-up control means, operates the internal combustion engine on the basis of a driving force that is required to propel the hybrid vehicle and controls the variable valve actuating device on the basis of a rotation speed and torque of the internal combustion engine. An output of the internal combustion engine at the second operating point is larger than an output of the internal combustion engine at the first operating point.

Further another aspect of the invention provides a control method for a hybrid vehicle. The hybrid vehicle includes an electric motor, an internal combustion engine, an exhaust emission control device and a controller. The electric motor is configured to generate a vehicle driving force. The internal combustion engine includes a variable valve actuating device. The variable valve actuating device is configured to change the operation characteristic of the intake valve to one of a first characteristic and a second characteristic. At least one of a valve lift or valve operating angle of the intake valve at the time when the operation characteristic is the second characteristic is larger than the corresponding at least one of the valve lift or valve operating angle of the intake valve at the time when the operation characteristic is the first characteristic. The exhaust emission control device is configured to purify exhaust gas from the internal combustion engine with the use of a catalyst. The control method includes executing first warm-up control by the controller. The first warm-up control is control for operating the internal combustion engine at a first operating point and operating the internal combustion engine while an ignition timing of the internal combustion engine at the time when the internal combustion engine is operated at the first operating point is controlled to a retarded side than an ignition timing of the internal combustion engine at the time when the internal combustion engine is operated at a second operating point. The control method includes executing second warm-up control by the controller. The second warm-up control is control for operating the internal combustion engine at the second operating point and controlling the variable valve actuating device such that the operation characteristic is changed to the second characteristic. The control method further includes executing ordinary control by the controller. The ordinary control is control for, after the second warm-up control is executed, operating the internal combustion engine on the basis of a driving force that is required to propel the hybrid vehicle and controlling the variable valve actuating device on the basis of a rotation speed and torque of the internal combustion engine. An output of the internal combustion engine at the second operating point is larger than an output of the internal combustion engine at the first operating point.

According to the invention, it is possible to provide a hybrid vehicle that is able to improve fuel economy and emissions during catalyst warm-up control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 17 is a waveform chart for illustrating a controlled state of the engine in catalyst warm-up control and subsequent ordinary control according to the second embodiment;

FIG. 19 is a waveform chart for illustrating a controlled state of the engine according to a second alternative embodiment;

DETAILED DESCRIPTION OF EMBODIMENTS

Figure 1:
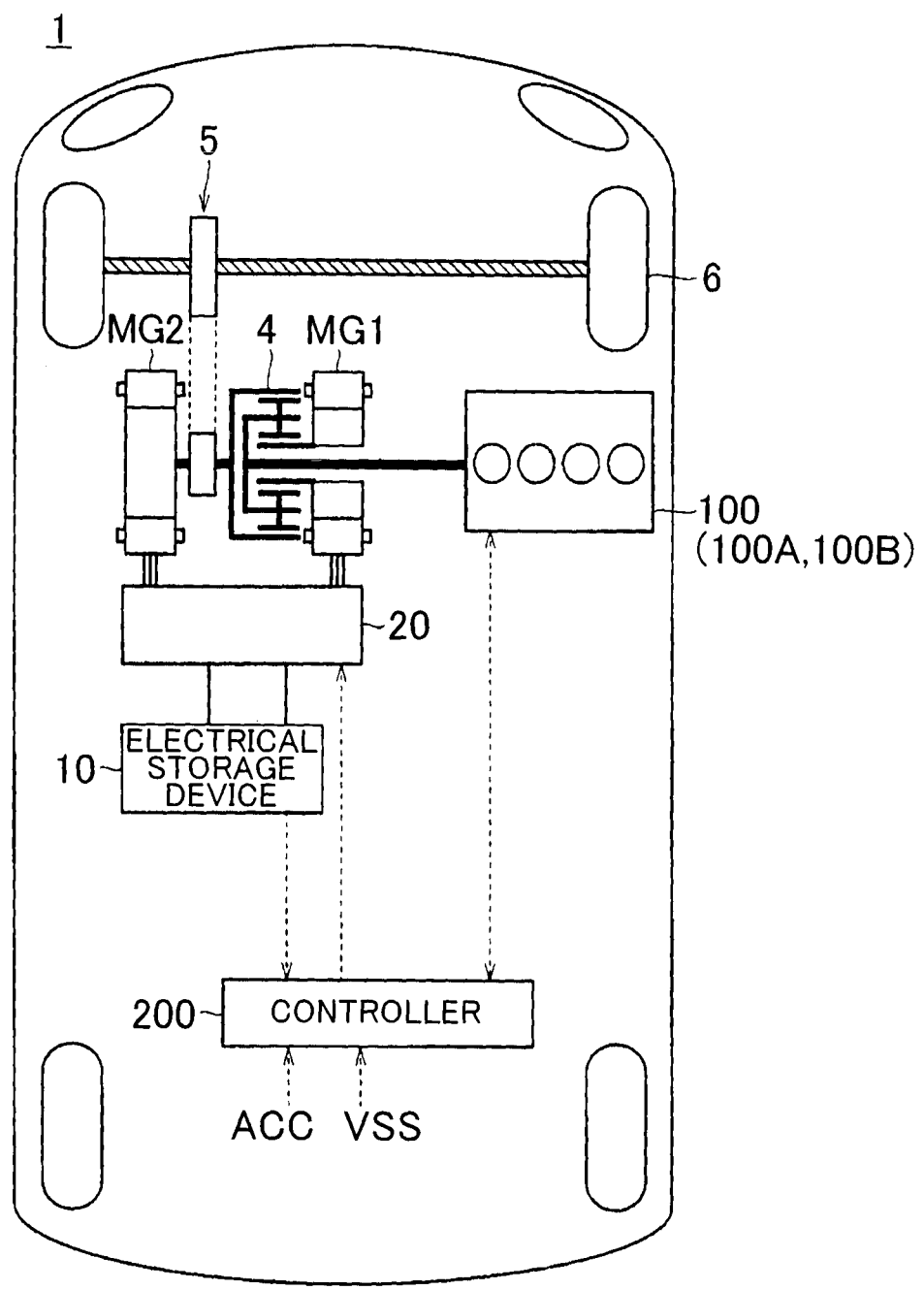
FIG. 1 is a block diagram that shows the overall configuration of a hybrid vehicle according to a first embodiment of the invention.

Hereinafter, embodiments of the invention will be described in detail with reference to the accompanying drawings. The plurality of embodiments will be described below; however, appropriate combinations of the configurations described in the embodiments are expected at the time of filing. Like reference numerals denote the same or corresponding portions in the drawings, and the description thereof will not be repeated.

FIG. 1 is a block diagram that shows the overall configuration of a hybrid vehicle according to the first embodiment of the invention. As shown in FIG. 1, the hybrid vehicle 1 includes an engine 100, motor generators MG1, MG2, a power split device 4, a reduction gear 5, and drive wheels 6. The hybrid vehicle 1 further includes an electrical storage device 10, a power control unit (PCU) 20 and a controller 200.

The hybrid vehicle 1 is able to travel by using driving force that is output from at least one of the engine 100 or the motor generator MG2. The engine 100 is, for example, an internal combustion engine, such as a gasoline engine and a diesel engine. The engine 100 generates driving force for propelling the vehicle. The engine 100 also generates driving force for driving the motor generator MG1 that is able to operate as a Generator.

The engine 100 can be cranked by the motor generator MG1 to start up. The engine 100 includes a variable valve actuating device for changing the operation characteristic of each intake valve. The variable valve actuating device is controlled by the controller 200 on the basis of a traveling condition of the vehicle and startability of the engine 100. An exhaust emission control device is provided in an exhaust passage of the engine 100. The exhaust emission control device purifies exhaust gas from the engine 100 with the use of a catalyst. The configuration of the engine 100, variable valve actuating device and exhaust emission control device will be described in detail later.

The power split device 4 is configured to be able to split driving force, which is generated by the engine 100, into driving force for driving the drive wheels 6 via the reduction gear 5 and driving force for driving the motor generator MG1. The power split device 4 is formed of, for example, a planetary gear train.

Each of the motor generators MG1, MG2 is an alternating-current rotary electric machine, and is, for example, a three-phase alternating-current synchronous motor generator. The motor generator MG1 can generate electric power by using the driving force of the engine 100. The driving force of the engine 100 is received via the power split device 4. For example, when the SOC of the electrical storage device 10 reaches a predetermined lower limit, the engine 100 starts up, and electric power is generated by the motor generator MG1. Electric power generated by the motor generator MG1 is converted in voltage by the PCU 20. The converted electric power is temporarily stored in the electrical storage device 10, or the converted electric power is directly supplied to the motor generator MG2.

The motor generator MG2 generates driving force by using at least one of electric power stored in the electrical storage device 10 or electric power generated by the motor generator MG1. Driving force of the motor generator MG2 is transmitted to the drive wheels 6 via the reduction gear 5. In FIG. 1, the drive wheels 6 are front wheels. Instead of the front wheels or in addition to the front wheels, rear wheels may be driven by the motor generator MG2.

During braking of the vehicle, the motor generator MG2 is driven by the drive wheels 6 via the reduction gear 5, and the motor generator MG2 operates as a generator. Thus, the motor generator MG2 operates as a regenerative brake that converts braking energy to electric power. Electric power generated by the motor generator MG2 is stored in the electrical storage device 10.

The PCU 20 is a drive unit for driving the motor generators MG1, MG2. The PCU 20 includes an inverter for driving the motor generators MG1, MG2, and can further include a converter for converting voltage between the inverter and the electrical storage device 10.

The electrical storage device 10 is a rechargeable direct-current power supply, and includes, for example, a nickel-metal hydride secondary battery or a lithium ion secondary battery. The voltage of the electrical storage device 10 is, for example, about 200 V. The electrical storage device 10 stores electric power generated by the motor generators MG1, MG2. A large-capacitance capacitor may also be employed as the electrical storage device 10. The electrical storage device 10 may be any electric power buffer as long as the electric power buffer is able to temporarily store electric power generated by the motor generators MG1, MG2 and supply the stored electric power to the motor generator MG2. A sensor is provided at the electrical storage device 10. The sensor is used to detect the temperature Tb, current Ib and voltage Vb of the electrical storage device 10. Values detected by the sensor are output to the controller 200.

The controller 200 includes an electronic control unit (ECU) that includes a central processing unit (CPU), a storage device, input/output buffers, and the like (which are not shown). The controller 200 receives signals (an accelerator operation amount ACC, a vehicle speed VSS, and the like) from various sensors and outputs control signals to devices, and executes control over the devices in the hybrid vehicle 1. As major controls, the controller 200 executes traveling control over the hybrid vehicle 1, catalyst warm-up control for warming up the catalyst of the exhaust emission control device, control over the variable valve actuating device appropriate for traveling control and catalyst warm-up control, and the like. The operation of the controller 200 will be described later.

Figure 2:
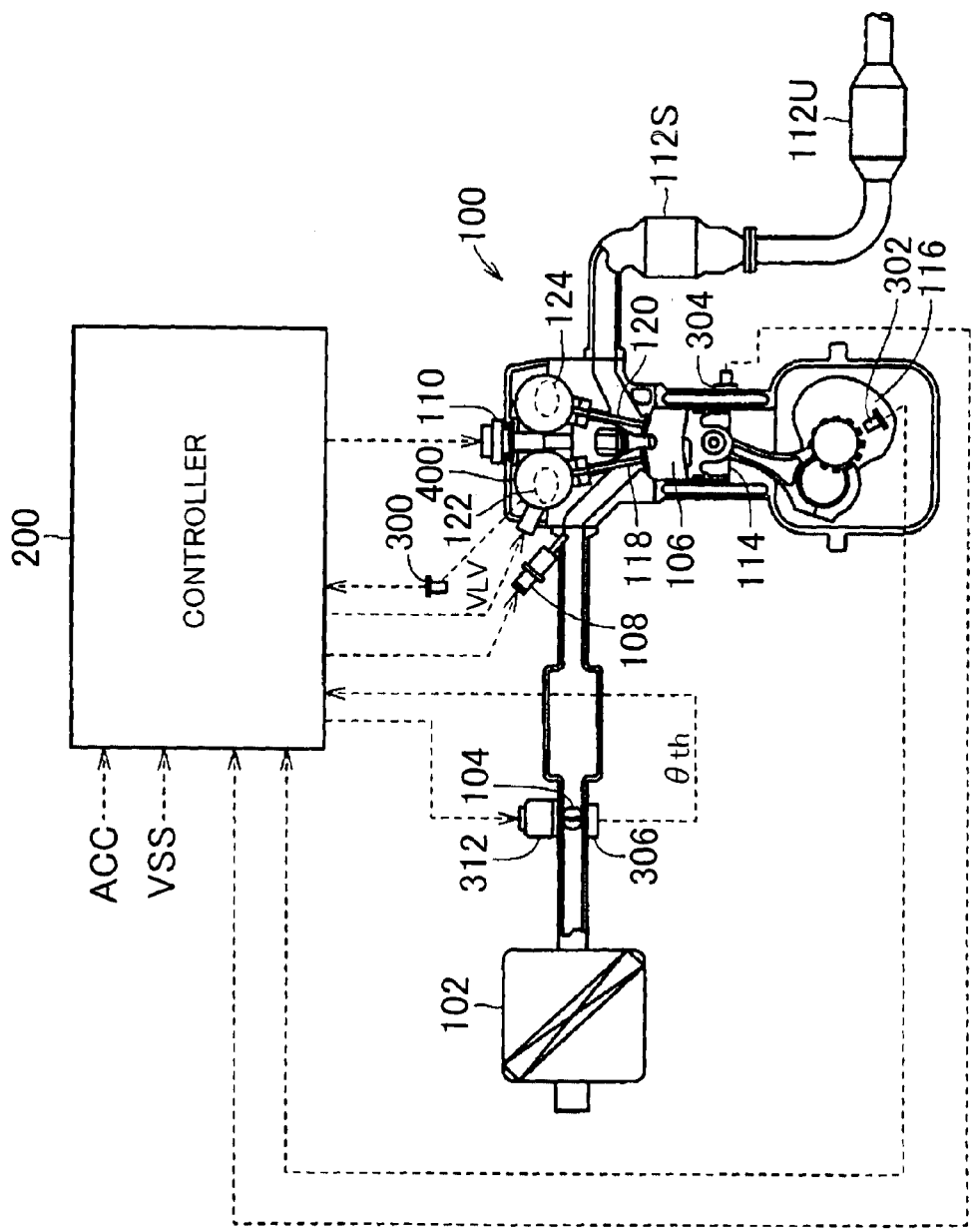
FIG. 2 is a configuration view of an engine shown in FIG. 1.

FIG. 2 is a configuration view of the engine 100 shown in FIG. 1. As shown in FIG. 2, air is taken into the engine 100 through an air cleaner 102. An intake air amount is adjusted by a throttle valve 104. The throttle valve 104 is driven by a throttle motor 312.

Intake air is mixed with fuel in each cylinder 106 (combustion chamber). Fuel is injected from each injector 108 to the corresponding cylinder 106. In this embodiment, the engine 100 will be described as a port injection type in which an injection hole of the injector 108 is provided in an intake port. In addition to the port injection injector 108, a direct injection injector that directly injects fuel into the corresponding cylinder 106 may be provided. Furthermore, only a direct injection injector may be provided.

Air-fuel mixture in each cylinder 106 is ignited by a corresponding ignition plug 110 to combust. The combusted air-fuel mixture, that is, exhaust gas, is emitted to the exhaust passage. The exhaust emission control device is provided in the exhaust passage. The exhaust emission control device purifies exhaust gas with the use of the catalyst. The exhaust emission control device includes a catalyst 112S (hereinafter, also referred to as "start catalyst (S/C catalyst)") and a catalyst 112U (hereinafter, also referred to as "under-floor (U/F) catalyst"). The catalyst 112U is arranged downstream of the S/C catalyst 112S. Exhaust gas is purified by the S/C catalyst 112S and the U/F catalyst 112U, and is then emitted to the outside of the vehicle. A piston 114 is pushed downward by combustion of air-fuel mixture, and a crankshaft 116 rotates.

The intake valve 118 and an exhaust valve 120 are provided at the top portion of each cylinder 106. The amount of air that is introduced into each cylinder 106 and the timing of introduction are controlled by the corresponding intake valve 118. The amount of exhaust gas that is emitted from each cylinder 106 and the timing of emission are controlled by the corresponding exhaust valve 120. Each intake valve 118 is driven by a cam 122. Each exhaust valve 120 is driven by a cam 124.

As will be described in detail later, the valve lift and valve operating angle of each intake valve 118 are controlled by a variable valve lift (VVL) device 400. The valve lift and valve operating angle of each exhaust valve 120 may also be controllable. A variable valve timing (VVT) device that controls the open/close timing of each valve may be combined with the VVL device 400.

The controller 200 controls a throttle opening degree θth, an ignition timing, a fuel injection timing, a fuel injection amount, and the operating state (open/close timing, valve lift, valve operating angle, and the like) of each intake valve so that the engine 100 is operated at a desired operating point on the basis of a traveling condition of the vehicle and a warm-up condition of the exhaust emission control device. The operating point is an operating point of the engine 100, at which a power, torque and rotation speed of the engine 100 are determined. The operating point of the engine 100 is determined so that the engine 100 outputs a desired power or torque. In the first embodiment, the operating point is set so that the power of the engine 100 becomes a desired operating power. Other than a signal indicating the accelerator operation amount ACC and a signal indicating the vehicle speed VSS, signals are input to the controller 200 from various sensors, that is, a cam angle sensor 300, a crank angle sensor 302, a knock sensor 304 and a throttle opening degree sensor 306.

The cam angle sensor 300 outputs a signal indicating a cam position. The crank angle sensor 302 outputs signals indicating the rotation speed of the crankshaft 116 (engine rotation speed) and the rotation angle of the crankshaft 116. The knock sensor 304 outputs a signal indicating the strength of vibrations of the engine 100. The throttle opening degree sensor 306 outputs a signal indicating the throttle opening degree θth. The controller 200 controls the engine 100 on the basis of the signals from these sensors.

Figure 3:
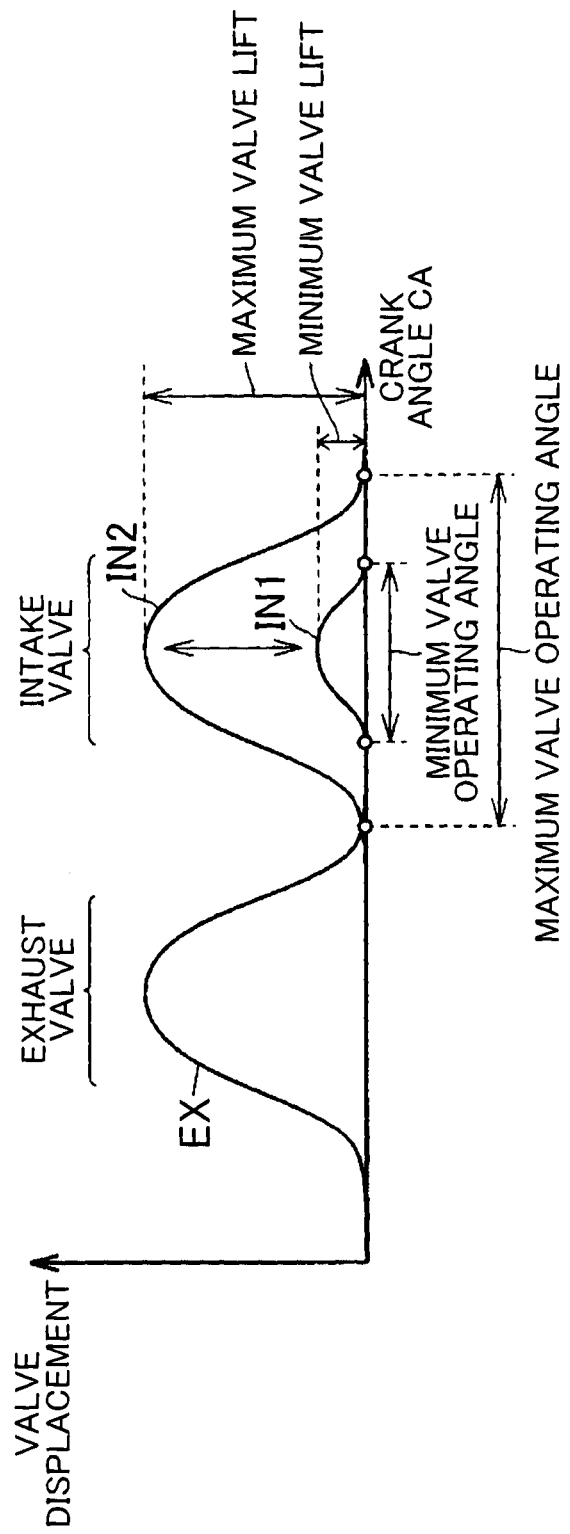
FIG. 3 is a graph that shows the correlation between a crank angle and a valve displacement that is achieved by a VVL device.

FIG. 3 is a graph that shows the correlation between a crank angle and a valve displacement that is achieved by the VVL device 400. As shown in FIG. 3, each exhaust valve 120 (FIG. 2) opens and closes in an exhaust stroke, and each intake valve 118 (FIG. 2) opens and closes in an intake stroke. A waveform EX indicates the valve displacement of each exhaust valve 120. Waveforms IN1, IN2 each indicate a valve displacement of each intake valve 118. The valve displacement is a displacement of a valve from a state where the valve is closed. In the following description, the valve lift is a valve displacement at the time when the opening degree of the intake valve 118 has reached a peak, and the valve operating angle is a crank angle of a period from when the intake valve 118 opens to when the intake valve 118 closes.

The operation characteristic of each intake valve 118 is changed by the VVL device 400 between the waveforms IN1, IN2. The waveform IN1 indicates the case where the valve lift and the valve operating angle are minimum. The waveform IN2 indicates the case where the valve lift and the valve operating angle are maximum. In the VVL device 400, the valve operating angle increases with an increase in the valve lift. In the first embodiment, the VVL device 400 is configured to be able to change the valve lift and the valve operating angle in three steps as shown later in FIG. 6.

Figure 4:
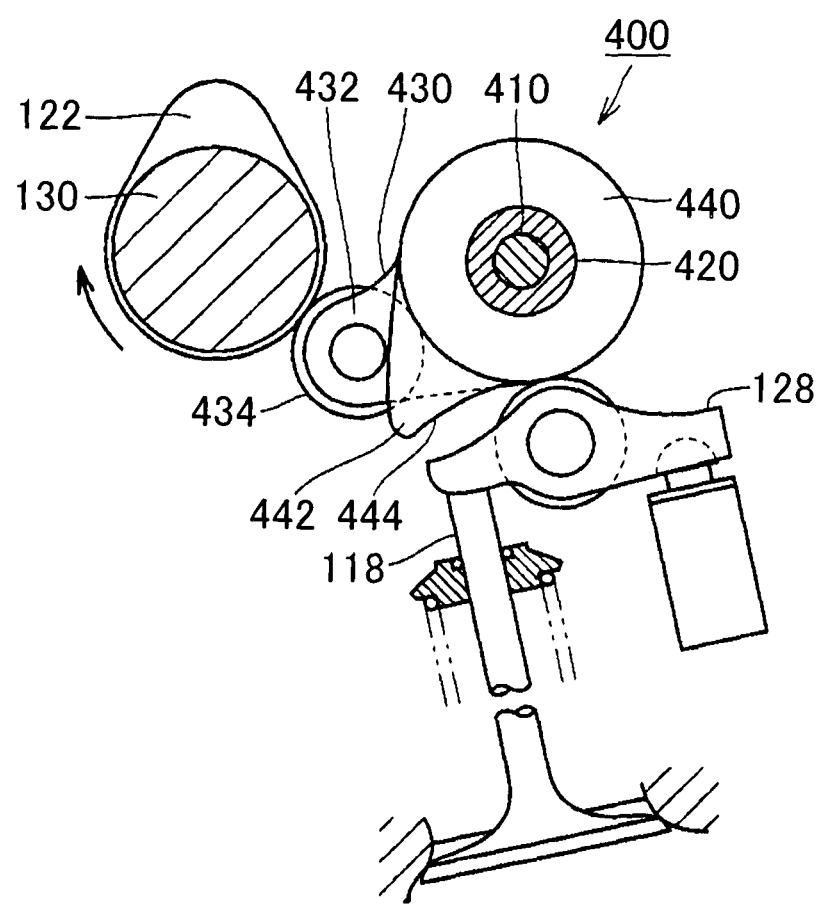
FIG. 4 is a front view of the VVL device.

FIG. 4 is a front view of the VVL device 400. The configuration shown in FIG. 4 is one example. The VVL device 400 is not limited to such a configuration. As shown in FIG. 4, the VVL device 400 includes a drive shaft 410, a support pipe 420, an input arm 430, and oscillation cams 440. The drive shaft 410 extends in one direction. The support pipe 420 covers the outer periphery of the drive shaft 410. The input arm 430 and the oscillation cams 440 are arranged in the axial direction of the drive shaft 410 on the outer periphery of the support pipe 420. An actuator (not shown) that linearly actuates the drive shaft 410 is connected to the distal end of the drive shaft 410.

The VVL device 400 includes the one input arm 430 in correspondence with the one cam 122 provided in each cylinder. The two oscillation cams 440 are provided on both sides of each input arm 430 in correspondence with the pair of intake valves 118 provided for each cylinder.

The support pipe 420 is formed in a hollow cylindrical shape, and is arranged parallel to a camshaft 130. The support pipe 420 is fixed to a cylinder head so as not to be moved in the axial direction or rotated.

The drive shaft 410 is inserted inside the support pipe 420 so as to be slidable in the axial direction. The input arm 430 and the two oscillation cams 440 are provided on the outer periphery of the support pipe 420 so as to be oscillatable about the axis of the drive shaft 410 and not to move in the axial direction.

The input arm 430 includes an arm portion 432 and a roller portion 434. The arm portion 432 protrudes in a direction away from the outer periphery of the support pipe 420. The roller portion 434 is rotatably connected to the distal end of the arm portion 432. The input arm 430 is provided such that the roller portion 434 is arranged at a position at which the roller portion 434 is able to contact the cam 122.

Each oscillation cam 440 has a substantially triangular nose portion 442 that protrudes in a direction away from the outer periphery of the support pipe 420. A concave cam face 444 is formed at one side of the nose portion 442. A roller rotatably attached to a rocker arm 128 is pressed against the cam face 444 by the urging force of a valve spring provided in the intake valve 118.

The input arm 430 and the oscillation cams 440 integrally oscillate about the axis of the drive shaft 410. Therefore, as the camshaft 130 rotates, the input arm 430 that is in contact with the cam 122 oscillates, and the oscillation cams 440 oscillate in interlocking with movement of the input arm 430. The movements of the oscillation cams 440 are transferred to the intake valves 118 via the rocker arms 128, and the intake valves 118 are opened or closed.

The VVL device 400 further includes a device that changes a relative phase difference between the input arm 430 and each oscillation cam 440 around the axis of the support pipe 420. The valve lift and valve operating angle of each intake valve 118 are changed as needed by the device that changes the relative phase difference.

That is, when the relative phase difference between the input arm 430 and each oscillation cam 440 is increased, the oscillation angle of each rocker arm 128 is increased with respect to the oscillation angle of each of the input arm 430 and the oscillation cams 440, and the valve lift and valve operating angle of each intake valve 118 are increased.

When the relative phase difference between the input arm 430 and each oscillation cam 440 is reduced, the oscillation angle of each rocker arm 128 is reduced with respect to the oscillation angle of each of the input arm 430 and the oscillation cams 440, and the valve lift and valve operating angle of each intake valve 118 are reduced.

Figure 5:
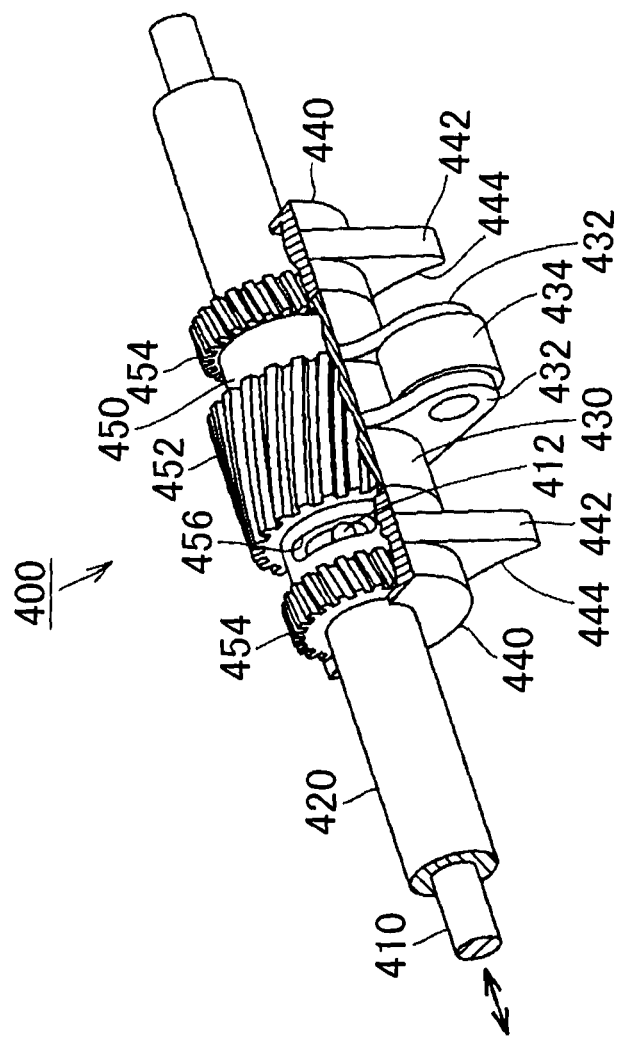
FIG. 5 is a perspective view that partially shows the VVL device shown in FIG. 4.

FIG. 5 is a perspective view that partially shows the VVL device 400 shown in FIG. 4. FIG. 5 shows a structure with part cut away so that the internal structure is understood. As shown in FIG. 5, a slider gear 450 is accommodated in a space defined between the outer periphery of the support pipe 420 and the set of input arm 430 and two oscillation cams 440. The slider gear 450 is supported on the support pipe 420 so as to be rotatable and slidable in the axial direction. The slider gear 450 is provided on the support pipe 420 so as to be slidable in the axial direction.

The slider gear 450 includes a helical gear 452. The helical gear 452 is located at the center portion of the slider gear 450 in the axial direction. Right-handed screw spiral helical splines are formed on the helical gear 452. The slider gear 450 includes helical gears 454. The helical gears 454 are respectively located on both sides of the helical gear 452. Left-handed screw spiral helical splines opposite to those of the helical gear 452 are formed on each of the helical gears 454.

On the other hand, helical splines corresponding to the helical gears 452, 454 are respectively formed on the inner peripheries of the input arm 430 and two oscillation cams 440. The inner peripheries of the input arm 430 and two oscillation cams 440 define a space in which the slider gear 450 is accommodated. That is, the right-handed spiral helical splines are formed on the input arm 430, and the helical splines are in mesh with the helical gear 452. The left-handed spiral helical splines are formed on each of the oscillation cams 440, and the helical splines are in mesh with the corresponding helical gear 454.

An oblong hole 456 is formed in the slider gear 450. The oblong hole 456 is located between the helical gear 452 and one of the helical gears 454, and extends in the circumferential direction. Although not shown in the drawing, an oblong hole is formed in the support pipe 420, and the oblong hole extends in the axial direction so as to partially overlap with the oblong hole 456. A locking pin 412 is integrally provided in the drive shaft 410 inserted inside the support pipe 420. The locking pin 412 protrudes through the overlapped portions of these oblong hole 456 and oblong hole (not shown).

When the drive shaft 410 is moved in the axial direction by the actuator (not shown) coupled to the drive shaft 410, the slider gear 450 is pressed by the locking pin 412, and the helical gears 452, 454 move in the axial direction of the drive shaft 410 at the same time. When the helical gears 452, 454 are moved in this way, the input arm 430 and the oscillation cams 440 spline-engaged with these helical gears 452, 454 do not move in the axial direction. Therefore, the input arm 430 and the oscillation cams 440 pivot around the axis of the drive shaft 410 through meshing of the helical splines.

At this time, the helical splines respectively formed on the input arm 430 and each oscillation cam 440 have opposite orientations. Therefore, the pivot direction of the input arm 430 and the pivot direction of each oscillation cam 440 are opposite to each other. Thus, the relative phase difference between the input arm 430 and each oscillation cam 440 changes, with the result that the valve lift and valve operating angle of each intake valve 118 are changed as is already described.

The VVL device 400 is not limited to this type. For example, a VVL device that electrically drives each valve, a VVL device that hydraulically drives each valve, or the like, may be used.

The controller 200 (shown in FIG. 2) controls the valve lift and valve operating angle of each intake valve 118 by adjusting an operation amount of the actuator that linearly moves the drive shaft 410.

Figure 6:
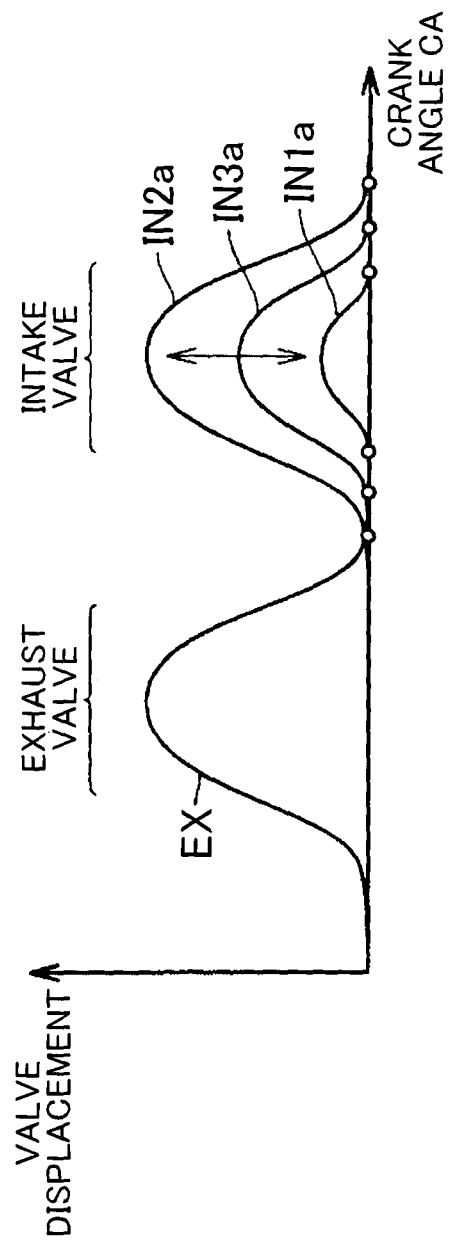
FIG. 6 is a graph that shows the correlation between a crank angle and a valve displacement that is achieved by the VVL device that is able to change the operation characteristic of each intake valve in three steps.

FIG. 6 is a graph that shows the correlation between a crank angle and a valve displacement that is achieved by the VVL device 400 that is able to change the operation characteristic of each intake valve 118 in three steps. As shown in FIG. 6, the VVL device 400 is able to change the operation characteristic of each intake valve 118 to any one of first to third characteristics. The first characteristic is indicated by a waveform IN1a. The second characteristic is indicated by a waveform IN2a. The valve lift and the valve operating angle in the second characteristic are larger than the valve lift and the valve operating angle in the first characteristic. The third characteristic is indicated by a waveform IN3a. The valve lift and the valve operating angle in the third characteristic are larger than the valve lift and the valve operating angle in the first characteristic, and are smaller than the valve lift and the valve operating angle in the second characteristic.

In the following description, the first characteristic (waveform IN1a) of which the valve lift and the valve operating angle are relatively small among the three operation characteristics is also referred to as "small cam characteristic", and the second characteristic (waveform IN2a) of which the valve lift and the valve operating angle are relatively large among the three operation characteristics is also referred to as "large cam characteristic". The third characteristic (waveform IN3a) of which the valve lift and the valve operating angle are larger than the small cam characteristic and smaller than the large cam characteristic is also referred to as "intermediate cam characteristic".

Figure 7:
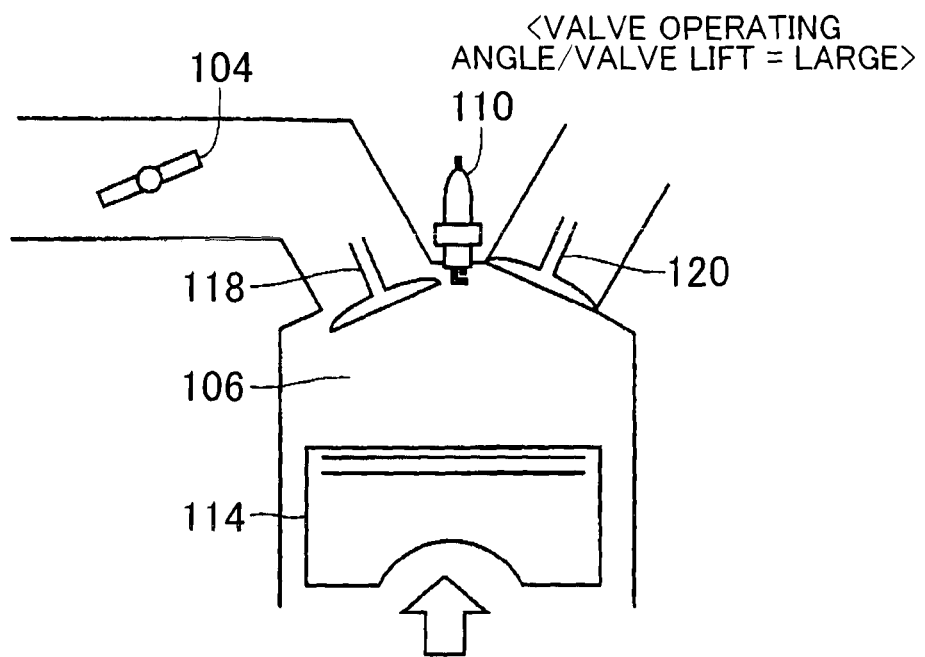
FIG. 7 is a view that illustrates an operation when a piston moves upward in a state where the operation characteristic of each intake valve is a large cam characteristic.

FIG. 7 is a view that illustrates an operation when the piston moves upward in a state where the operation characteristic of each intake valve 118 is the large cam characteristic. As shown in FIG. 7, when the operation characteristic of each intake valve 118 is the large cam characteristic, the close timing of each intake valve 118 delays when the corresponding piston 114 moves upward. Thus, the engine 100 runs on the Atkinson cycle, and fuel economy is improved. On the other hand, part of air-fuel mixture taken into the cylinder 106 in an intake stroke is returned to the outside of the cylinder 106, with the result that the compression ratio of air-fuel mixture in the cylinder 106 decreases, so ignitability of air-fuel mixture deteriorates. Thus, a combustion state of air-fuel mixture tends to deteriorate, and emissions in exhaust gas deteriorate.

Figure 8:
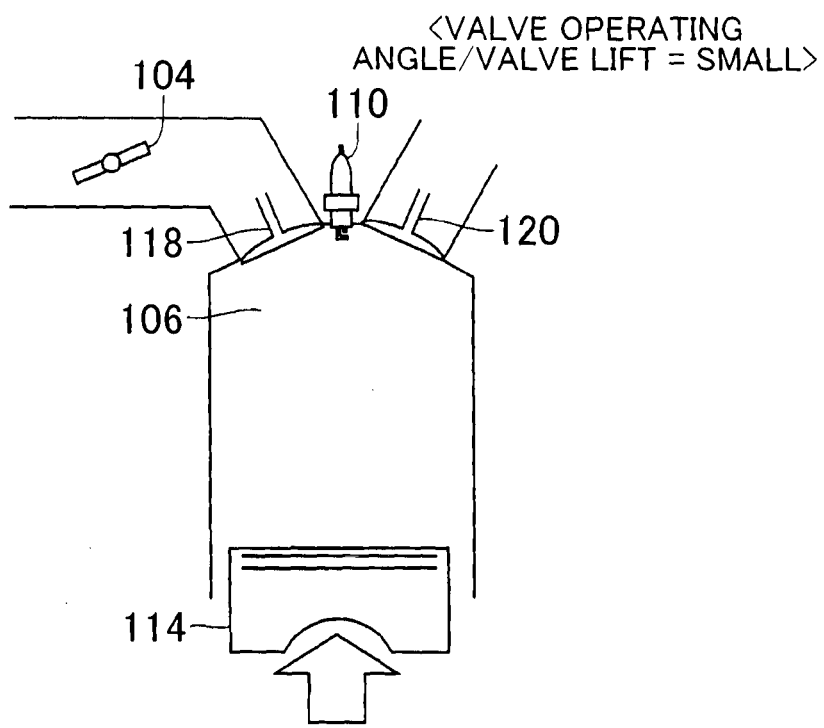
FIG. 8 is a view that illustrates an operation when the piston moves upward in a state where the operation characteristic of each intake valve is a small cam characteristic.
Figure 9:
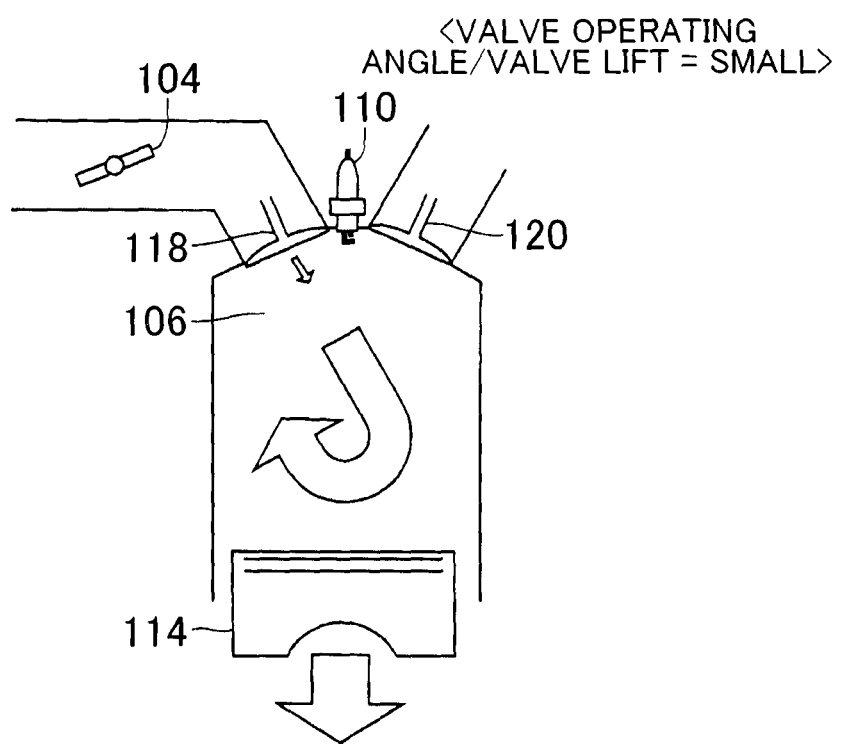
FIG. 9 is a view that illustrates an operation when the piston moves downward in a state where the operation characteristic of each intake valve is a small cam characteristic.

FIG. 8 is a view that illustrates an operation when the piston moves upward in a state where the operation characteristic of each intake valve 118 is the small cam characteristic. FIG. 9 is a view that illustrates an operation when the piston moves downward in a state where the operation characteristic of each intake valve 118 is the small cam characteristic. As shown in FIG. 8 and FIG. 9, when the operation characteristic of each intake valve 118 is the small cam characteristic, because the open timing of each intake valve 118 delays when the corresponding piston 114 moves downward, air-fuel mixture is taken in from the corresponding intake port in a state where a negative pressure is generated in the cylinder 106, so mixing of fuel in the cylinder 106 is facilitated. In addition, because the close timing of each intake valve 118 advances when the corresponding piston 114 moves upward, the compression ratio of air-fuel mixture in the cylinder 106 increases, so ignitability of air-fuel mixture improves. With these operations, the combustion state of air-fuel mixture becomes a good condition, so emissions in exhaust gas are improved. On the other hand, a pumping loss increases, so fuel economy relatively deteriorates.

Referring back to FIG. 1 and FIG. 2, the hybrid vehicle 1 is able to stop the engine 100 and travel by using the motor generator MG2 (EV mode). When a predetermined engine start-up condition is satisfied in an engine stopped state, an engine start-up process is executed, so the hybrid vehicle 1 shifts from an engine stopped state to an engine operated state. The engine start-up condition is satisfied when an output (power or torque) that is required of the hybrid vehicle 1 exceeds a predetermined threshold, when it is determined that it is required to warm up the S/C catalyst 112S (FIG. 2) provided in the exhaust passage.

When a predetermined catalyst warm-up condition for requiring warm-up of the S/C catalyst 112S is satisfied, the controller 200 executes catalyst warm-up control for warming up the S/C catalyst 112S by starting up the engine 100. The controller 200 executes catalyst warm-up control by separating the catalyst warm-up control into two steps, that is, first warm-up control and second warm-up control. That is, the first warm-up control is executed just after start-up of the engine 100. The controller 200 operates the engine 100 at a first operating power (for example, a low power of about 0 to 3 kW), and operates the engine 100 while the ignition timing of the engine 100 is retarded.

This is to early warm up the S/C catalyst 112S by suppressing the amount of exhaust gas as a result of suppressing the power of the engine 100 and increasing the temperature of exhaust gas as a result of retarding the ignition timing. The first operating power does not respond to a traveling power. The traveling power is output from the motor generator MG2.

When the exhaust gas upstream side of the S/C catalyst 112S is warmed up through first warm-up control and, as a result, a minimum exhaust gas purification ability is ensured, the controller 200 executes second warm-up control. That is, the controller 200 returns the ignition timing of the engine 100, which has been controlled to the retarded side, to an ordinary state, and operates the engine 100 at a second operating power larger than the first operating power. The second operating power does not respond to a traveling power, and is set to a predetermined value that does not exceed the exhaust gas purification ability of the S/C catalyst 112S. The predetermined value may be a constant value or may be increased stepwisely with an increase in the exhaust gas purification ability of the S/C catalyst 112S (with an increase in the temperature of the S/C catalyst 112S). During then, the traveling power is output from the motor generator MG2.

When the entire S/C catalyst 112S is warmed up and the exhaust gas purification ability of the S/C catalyst 112S reaches 100%, the controller 200 operates the engine 100 on the basis of the traveling power (hereinafter, referred to as "ordinary control" in contrast with the catalyst warm-up control). In the ordinary control, the hybrid vehicle 1 travels by driving the motor generator MG2 and the engine 100 on the basis of the traveling power (HV mode).

In the above-described catalyst warm-up control, during execution of the first warm-up control just after engine start-up, the combustion temperature of the engine 100 is low, and warm-up of the S/C catalyst 112S has not proceeded yet, so suppression of emissions in exhaust gas is strongly required. On the other hand, during execution of the second warm-up control, emissions in exhaust gas are improved with an increase in the exhaust gas purification ability of the S/C catalyst 112S, so there arises room for improvement in fuel economy. While the ignition timing of the engine 100 is being returned just after the start of the second warm-up control, the combustion state of the engine 100 becomes instable, so the priority of suppression of emissions is high.

Therefore, in the hybrid vehicle 1, the operation characteristic of each intake valve 118 is changed in accordance with the above-described first warm-up control or second warm-up control, and both suppression of emissions and improvement in fuel economy are achieved during the catalyst warm-up control. Specifically, as described with reference to FIG. 7 to FIG. 9, when the operation characteristic of each intake valve 118 is the large cam characteristic, fuel economy is improved as compared to when the operation characteristic is the small cam characteristic. On the other hand, when the operation characteristic of each intake valve 118 is the small cam characteristic, emissions in exhaust gas are suppressed as compared to when the operation characteristic is the large cam characteristic. Therefore, during execution of the first warm-up control in the first stage, the VVL device 400 is controlled so that the operation characteristic of each intake valve 118 becomes the small cam characteristic. Thus, emissions in exhaust gas are suppressed. On the other hand, during execution of the second warm-up control, in the initial stage in which the process of returning the ignition timing of the engine 100 is executed, both suppression of emissions and improvement in fuel economy are achieved by setting the operation characteristic of each intake valve 118 to the intermediate cam characteristic, and, after the ignition timing is returned, improvement in fuel economy is achieved by setting the operation characteristic of each intake valve 118 to the large cam characteristic.

Figure 10:
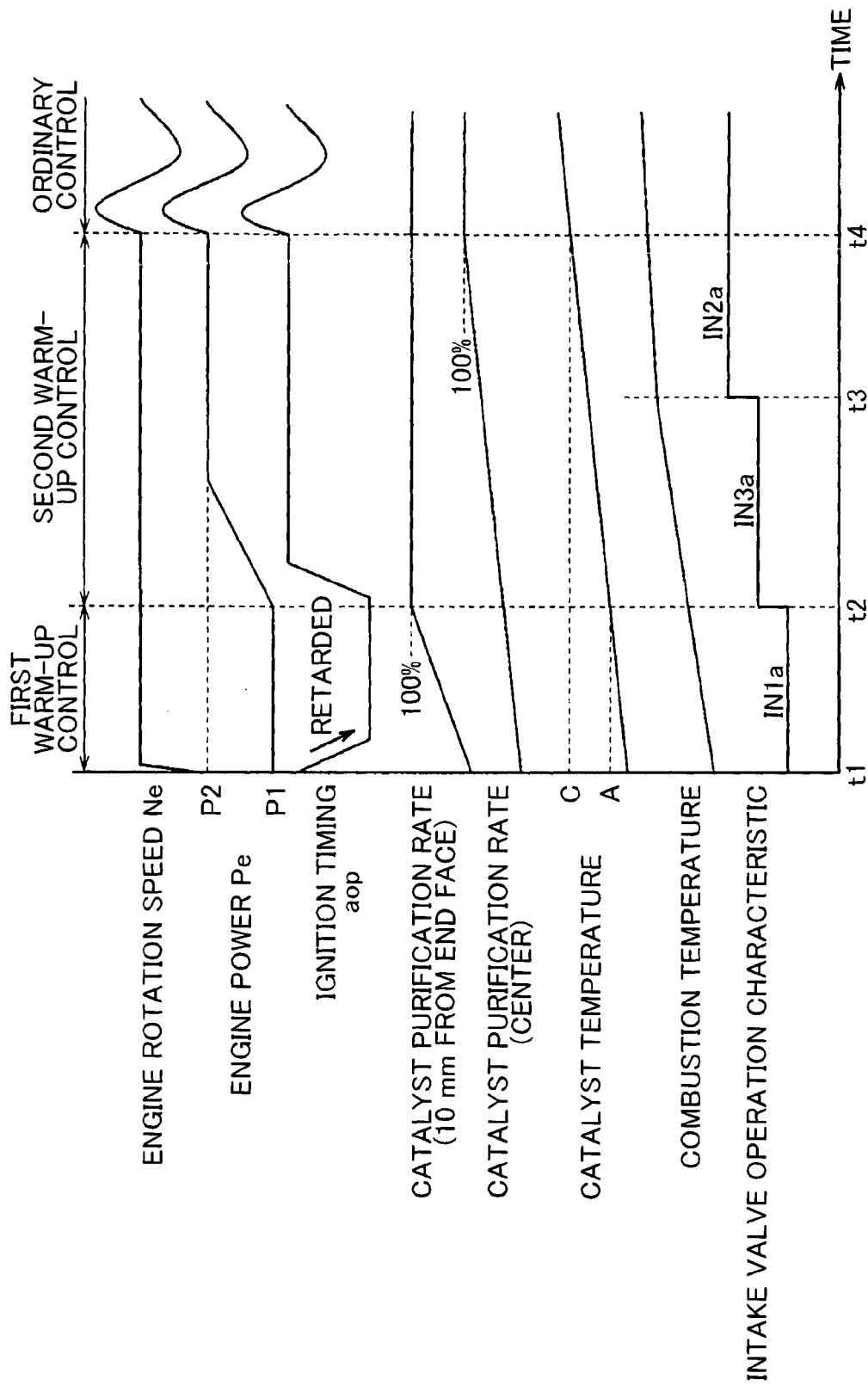
FIG. 10 is a waveform chart for illustrating a controlled state of the engine in catalyst warm-up control and subsequent ordinary control.

FIG. 10 is a waveform chart for illustrating a controlled state of the engine 100 in catalyst warm-up control and subsequent ordinary control. As shown in FIG. 10, the abscissa axis represents time, and the ordinate axes respectively represent the waveforms of, from the top, the engine rotation speed Ne, the engine power Pe, the ignition timing aop of the engine 100, a purification rate at an exhaust gas upstream end (for example, a location 10 mm from the end face) of the S/C catalyst 112S, a purification rate at the center of the S/C catalyst 112S, the combustion temperature of the engine 100, and the set operation characteristic of each intake valve 118.

The purification rate is defined by the ratio of the emission concentration of exhaust gas output with respect to the emission concentration (typically, HC concentration) of exhaust gas input, and is, actually, estimated on the basis of a catalyst temperature by using a prepared map, relational expression, or the like. The catalyst temperature is estimated from the intake air amount and ignition retardation amount of the engine 100 by using a prepared map, relational expression, or the like.

The catalyst purification rate (10 mm from the end face) is a purification rate at the exhaust gas upstream end of the S/C catalyst 112S. The catalyst purification rate indicates a purification rate at a location 10 mm from the exhaust gas upstream end face as an example, and, hereinafter, is also referred to as "end face purification rate".

The catalyst purification rate (center) indicates a purification rate of the entire S/C catalyst 112S, and, hereinafter, is also referred to as "center purification rate".

It is assumed that, at time t1, the warm-up condition for the S/C catalyst 112S is satisfied, and the engine 100 starts up in order to warm up the S/C catalyst 112S. At time t2, until the end face purification rate of the S/C catalyst 112S reaches 100%, the first warm-up control is executed. That is, the engine rotation speed Ne is constant, and the engine power Pe is set to a first operating power P1 (for example, a low power of about 0 to 3 kW). The traveling power of the hybrid vehicle 1 is output from the motor generator MG2. The ignition timing aop of the engine 100 is controlled to a retarded side, with the result that the temperature of combustion gas (exhaust gas) is increased.

During execution of the first warm-up control, the engine 100 is still low in temperature and the ignition timing aop is also controlled to the retarded side, so the combustion state of the engine 100 is instable. Therefore, the operation characteristic of each intake valve 118 is set to the small cam characteristic (IN1a in FIG. 6). Thus, as described with reference to FIG. 9, the combustion state of air-fuel mixture is placed in a good condition, with the result that suppression of emissions in exhaust gas is achieved.

At time t2, when the end face purification rate of the S/C catalyst 112S reaches 100%, the catalyst warm-up control changes from the first warm-up control to the second warm-up control. That is, the ignition timing aop of the engine 100 is returned from the retarded side to an ordinary state, and the engine power Pe is set to a second operating power P2 larger than the first operating power P1. As described above, the second operating power P2 does not respond to the traveling power, and is set to the predetermined value that does not exceed the exhaust gas purification ability of the S/C catalyst 112S. The second operating power P2 may be a constant value or may be increased with an increase in the exhaust gas purification ability of the S/C catalyst 112S (an increase in the temperature of the S/C catalyst 112S). The traveling power is output from the motor generator MG2. The engine power Pe is stably controlled irrespective of the traveling power, with the result that warm-up of the S/C catalyst 112S is continued in a state where the operation of the engine 100 is stable.

In addition, when the second warm-up control is started at time t2, the operation characteristic of each intake valve 118 is set to the intermediate cam characteristic (IN3a in FIG. 6). This intends to improve fuel economy by increasing the valve lift and valve operating angle of each intake valve 118. However, in the initial stage in which control for returning the engine ignition timing aop at which combustion becomes instable is executed and the combustion temperature is not still sufficiently high, the operation characteristic is not set to the large cam characteristic but is set to the intermediate cam characteristic. Thus, fuel economy is improved as compared to the first warm-up control, and emissions are suppressed as a result of improvement in combustion as compared to the case where the operation characteristic is set to the large cam characteristic.

When the combustion temperature reaches a predetermined temperature and the combustion state of the engine 100 becomes stable at time t3, the operation characteristic of each intake valve 118 is set to the large cam characteristic (IN2a shown in FIG. 6). Thus, the engine 100 runs on the Atkinson cycle, and fuel economy is improved.

When the center purification rate of the S/C catalyst 112S reaches 100% at time t4, the catalyst warm-up control (second warm-up control) ends, and ordinary control is executed. In this ordinary control, the engine 100 is operated on the basis of the traveling power, and the operation characteristic of each intake valve 118 is controlled by the VVL device 400 on the basis of the engine rotation speed Ne and the engine torque (not shown).

Figure 11:
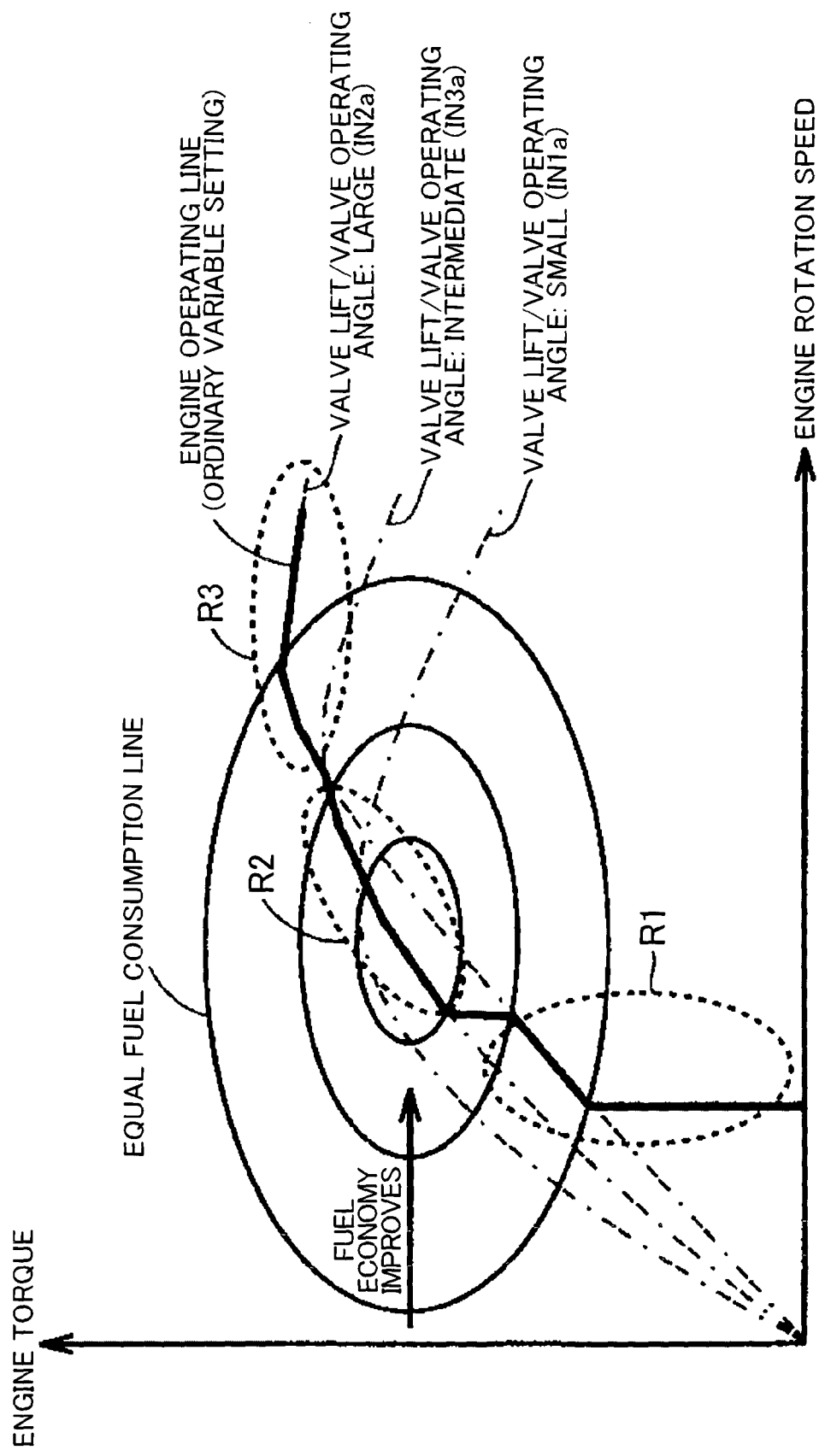
FIG. 11 is a graph that shows a setting example of the operation characteristic of each intake valve in ordinary control.

FIG. 11 is a graph that shows a setting example of the operation characteristic of each intake valve 118 in ordinary control. As shown in FIG. 11, the abscissa axis represents engine rotation speed, and the ordinate axis represents engine torque. The lines indicated by the alternate long and short dashed line indicate torque characteristics respectively corresponding to the first to third characteristics (IN1a to IN3a). The circles indicated by the continuous line indicate equal fuel consumption lines. The fuel economy improves as approaching the center of the circles. The engine 100 is basically operated along the engine operating line indicated by the continuous line.

In a low rotation speed region indicated by the region R1, it is important to suppress vibrations of the engine. In this low rotation speed region, introduction of exhaust gas recirculation (EGR) gas is stopped, and fuel economy is improved by using the Atkinson cycle. Thus, in the region R1, the second characteristic (IN2a) is selected as the operation characteristic of each intake valve 118 such that the valve lift and the valve operating angle increase. In an intermediate rotation speed region indicated by the region R2, fuel economy is improved by increasing the amount of introduction of EGR gas. Thus, in the region R2, the third characteristic (IN3a) is selected as the operation characteristic of each intake valve 118 such that the valve lift and the valve operating angle are intermediate.

That is, when the valve lift and valve operating angle of each intake valve 118 are large (second characteristic), improvement in fuel economy by using the Atkinson cycle is given a higher priority than improvement in fuel economy by introduction of EGR gas. On the other hand, when the intermediate valve lift and valve operating angle are selected (third characteristic), improvement in fuel economy by introduction of EGR gas is given a higher priority than improvement in fuel economy by using the Atkinson cycle.

In a high rotation speed region indicated by the region R3, a large amount of air is introduced into each cylinder by the inertia of intake air, and the output performance is improved as a result of an increase in actual compression ratio. Thus, in the region R3, the second characteristic (IN2a) is selected as the operation characteristic of each intake valve 118 such that the valve lift and the valve operating angle increase. In this way, the valve lift and the valve operating angle are determined on the basis of the operating state of the engine 100.

Figure 12:
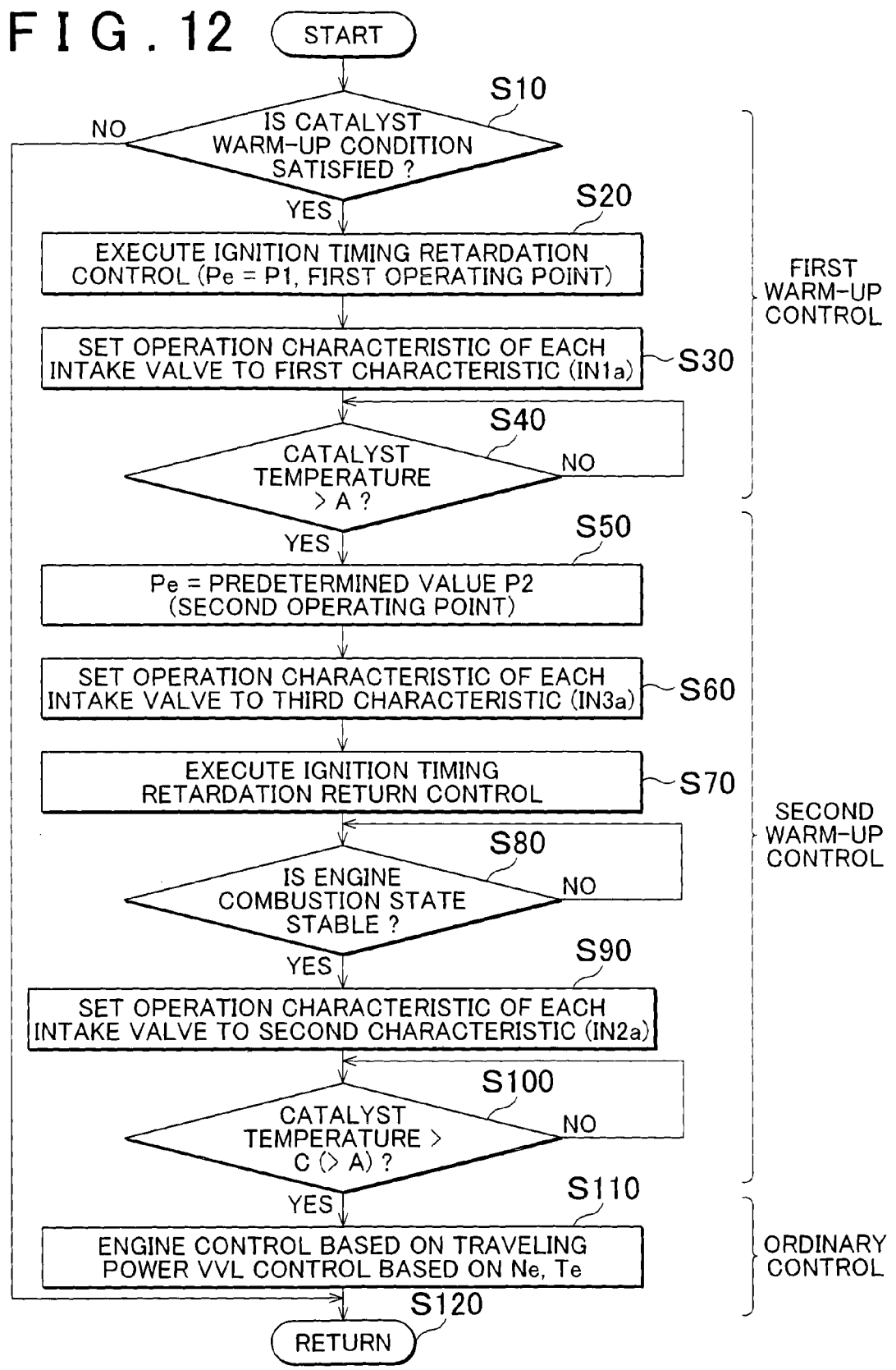
FIG. 12 is a flowchart that illustrates the control structure of catalyst warm-up control and intake valve control in the hybrid vehicle according to the first embodiment.

FIG. 12 is a flowchart that illustrates the control structure of catalyst warm-up control and intake valve control in the hybrid vehicle 1 according to the first embodiment. This flowchart is implemented by the controller 200 executing a prestored program at predetermined intervals. Alternatively, the processes of part of the steps may be implemented by constructing exclusive hardware (electronic circuit).

As shown in FIG. 12, the controller 200 determines whether the catalyst warm-up condition is satisfied (step S10). As an example, when the temperature of the S/C catalyst 112S has decreased to such an extent that the S/C catalyst 112S is not able to exercise the purification ability in the engine stopped state, it is determined that the catalyst warm-up condition is satisfied. When the condition is not satisfied (NO in step S10), the controller 200 proceeds with the process to step S120 without executing the following series of processes.

When it is determined in step S10 that the catalyst warm-up condition is satisfied (YES in step S10), the controller 200 starts the first warn-up control. That is, the controller 200 starts up the engine 100 and executes ignition timing retardation control (step S20). In this ignition timing retardation control, the ignition timing aop of the engine 100 is controlled to the retarded side, and the engine 100 is operated at the first operating point at which the engine power Pe is set to the first operating power P1. As an example, the first operating power P1 is set to a low power of about 0 to 3 kW. At the first operating point, the rotation speed of the engine 100 is set to an idling rotation speed, and the engine torque is set such that the engine power Pe becomes the first operating power P1.

In addition, the controller 200 controls the VVL device 400 such that the operation characteristic of each intake valve 118 is set to the first characteristic (IN1a), that is, the small cam characteristic, by the VVL device 400 (step S30).

Subsequently, the controller 200 determines whether the temperature of the S/C catalyst 112S exceeds a predetermined value A (step S40). The predetermined value A is the temperature of the S/C catalyst 112S for determining whether the end face purification rate of the S/C catalyst 112S has reached 100%, and the correlation between the temperature of the S/C catalyst 112S and the end face purification rate is obtained in advance by an experiment, or the like. The temperature of the S/C catalyst 112S is estimated from the intake air amount and ignition retardation amount of the engine 100, and the correlation between the temperature of the S/C catalyst 112S and each of the intake air amount and the ignition retardation amount is also obtained in advance by an experiment, or the like.

When it is determined in step S40 that the temperature of the S/C catalyst 112S exceeds the predetermined value A (YES in step S40), the controller 200 starts the second warm-up control. That is, the controller 200 controls the engine 100 such that the engine 100 is operated at the second operating point at which the engine power Pe is set to the second operating power P2 higher than the first operating power P1 (step S50). The second operating power does not respond to the traveling power, and is determined within the exhaust gas purification ability of the S/C catalyst 112S. The second operating power may be a constant value or may be increased with an increase in the exhaust gas purification ability of the S/C catalyst 112S (an increase in the temperature of the S/C catalyst 112S). As an example, at the second operating point, the rotation speed of the engine 100 is set to the idling rotation speed, the engine torque is set such that, after the catalyst warm-up control changes from the first warm-up control to the second warm-up control, the engine power Pe gradually increases from the first operating power P1 to the second operating power P2.

In addition, the controller 200 controls the VVL device 400 such that the operation characteristic of each intake valve 118 is set to the third characteristic (IN3a), that is, the intermediate cam characteristic, by the VVL device 400 (step S60).

In addition, the controller 200 executes ignition timing retardation return control for returning the ignition timing aop of the engine 100, which has been controlled to the retarded side in step S20, to the ordinary state (step S70). As for the rate of return of the ignition timing aop, fuel economy improves when the ignition timing aop is returned early at a high rate, whereas emissions deteriorate because of instable combustion, so the rate of return is determined in consideration of a balance between improvement in fuel economy and deterioration of emissions.

Subsequently, the controller 200 determines whether the combustion state of the engine 100 becomes stable (step S80). As an example, when the combustion temperature of the engine 100 exceeds a predetermined temperature, it is determined that the combustion state becomes stable. The combustion temperature is estimated on the basis of an engine coolant temperature, an oil temperature, an accumulated amount of air, and the like, by using a prepared map, relational expression, or the like. When it is determined that the combustion state of the engine 100 becomes stable (YES in step S80), the controller 200 controls the VVL device 400 such that the operation characteristic of each intake valve 118 is set to the second characteristic (IN2a), that is, the large cam characteristic (step S90).

Subsequently, the controller 200 determines whether the temperature of the S/C catalyst 112S exceeds a predetermined value C (>predetermined value A) (step S100). The predetermined value C is the temperature of the S/C catalyst 112S for determining whether the center purification rate of the S/C catalyst 112S has reached 100%.

When it is determined that the temperature of the S/C catalyst 112S exceeds the predetermined value C (YES in step S100), the controller 200 ends the catalyst warm-up control (second warm-up control), and proceeds with the process to the ordinary control. That is, the controller 200 controls the engine 100 on the basis of the traveling power, and controls the operation characteristic of each intake valve 118 with the use of the VVL device 400 in accordance with the operating line shown in FIG. 11 on the basis of the engine rotation speed Ne and the engine torque Te (step S110).

As described above, in the first embodiment, when warm-up of the S/C catalyst 112S is required, the catalyst warm-up control composed of the first warm-up control and the second warm-up control is executed while the hybrid vehicle 1 is traveling by using the motor generator MG2. During execution of the first warm-up control, the operation characteristic of each intake valve 118 is set to the small cam characteristic. When changed to the second warm-up control, the operation characteristic is changed to the intermediate cam characteristic. When the combustion state of the engine 100 becomes stable, the operation characteristic is changed to the large cam characteristic. With such a configuration, it is possible to improve fuel economy and emissions during catalyst warm-up control.

In the above-described first embodiment, the VVL device 400 is able to change the operation characteristic of each intake valve 118 in three steps. In this first alternative embodiment, the operation characteristic of each intake valve 118 is changeable in two steps.

Figure 13:
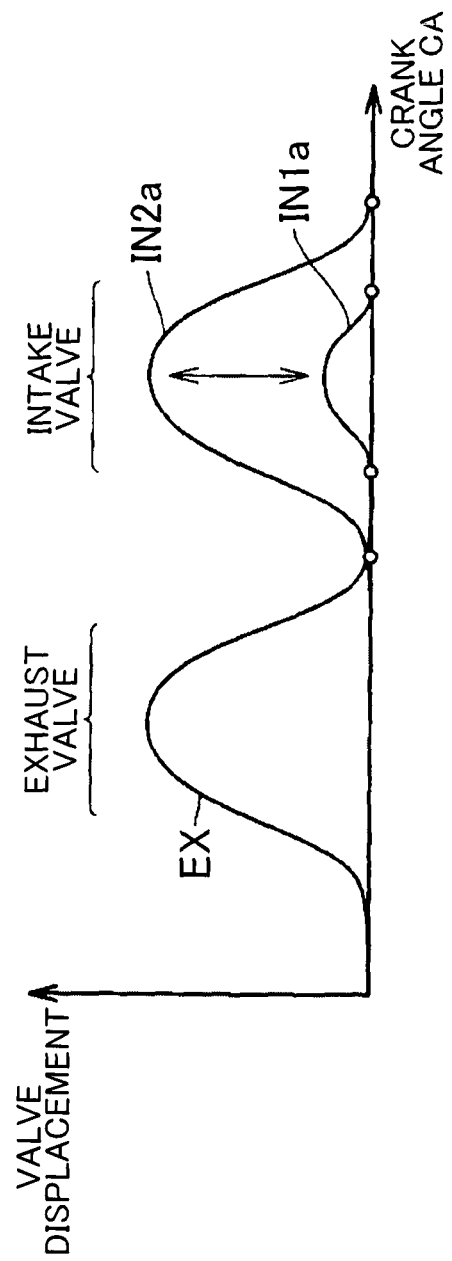
FIG. 13 is a graph that shows the correlation between a crank angle and a valve displacement that is achieved by a VVL device that is able to change the operation characteristic of each intake valve in two steps.

FIG. 13 is a graph that shows the correlation between a crank angle and a valve displacement that is achieved by a VVL device 400A that is able to change the operation characteristic of each intake valve 118 in two steps. As shown in FIG. 13, the VVL device 400A is able to change the operation characteristic of each intake valve 118 to one of the first characteristic (small cam characteristic) indicated by the waveform IN1a and the second characteristic (large cam characteristic) indicated by the waveform IN1a.

Figure 14:
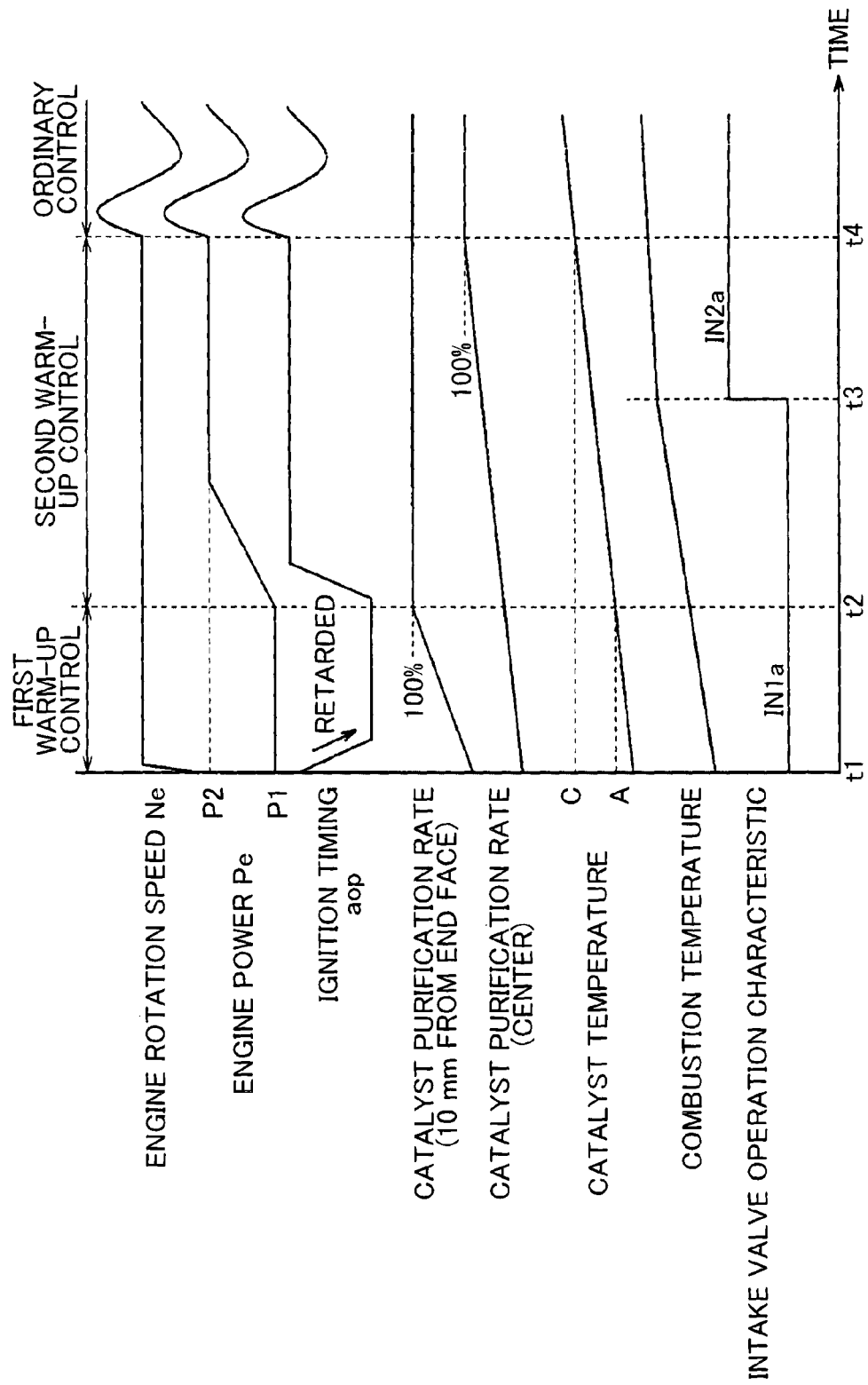
FIG. 14 is a waveform chart for illustrating a controlled state of the engine according to a first alternative embodiment.

FIG. 14 is a waveform chart for illustrating a controlled state of the engine 100 according to the first alternative embodiment. FIG. 14 is shown in correspondence with FIG. 10. As shown in FIG. 14, in the first alternative embodiment in which the operation characteristic of each intake valve 118 is changeable in two steps, even when the second warm-up control is started at time t2, the operation characteristic of each intake valve 118 is kept at the small cam characteristic. When the combustion state of the engine 100 becomes stable at time t3, the operation characteristic of each intake valve 118 is changed from the small cam characteristic to the large cam characteristic. That is, until the combustion state becomes stable, suppression of emissions is given a higher priority than improvement in fuel economy, and the operation characteristic of each intake valve 118 is set to the small cam characteristic.

Figure 15:
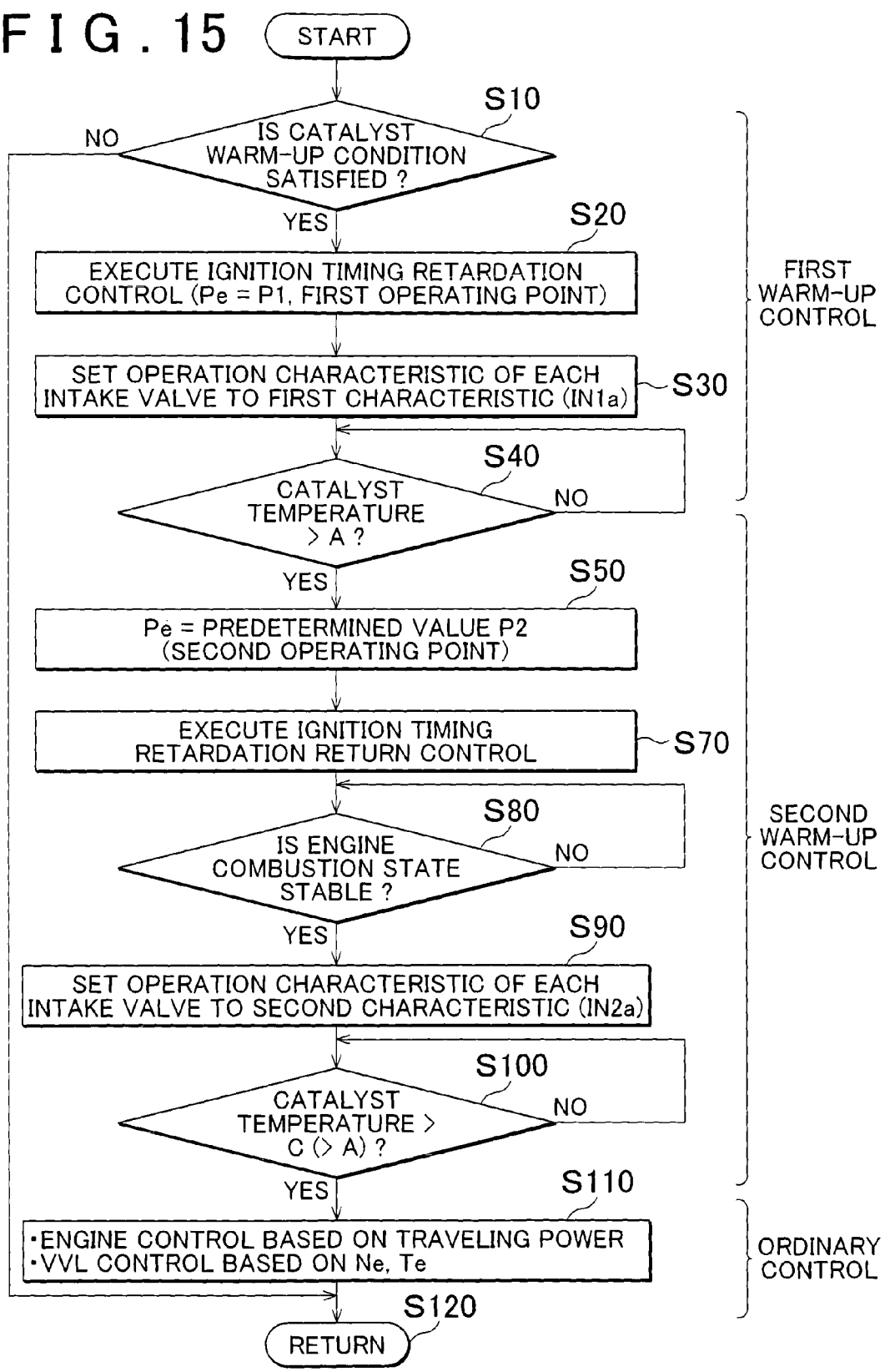
FIG. 15 is a flowchart that illustrates the control structure of catalyst warm-up control and intake valve control in the hybrid vehicle according to the first alternative embodiment.

FIG. 15 is a flowchart that illustrates the control structure of catalyst warm-up control and intake valve control in the hybrid vehicle 1 according to the first alternative embodiment. As shown in FIG. 15, the flowchart is formed of a configuration that does not include step S60 in the flowchart shown in FIG. 12. That is, the second warm-up control is started when the temperature of the S/C catalyst 112S exceeds the predetermined value A in step S40, and, even when the operating point of the engine 100 is changed to the second operating point in step S50, the operation characteristic of each intake valve 118 is kept at the first characteristic (IN1a), that is, the small cam characteristic.

When it is determined in step S80 that the combustion state of the engine 100 becomes stable, the operation characteristic of each intake valve 118 is set to the second characteristic (IN2a) in step S90. That is, the operation characteristic of each intake valve 118 is changed from the small cam characteristic to the large cam characteristic. The other processes are the same as those of the flowchart shown in FIG. 12.

As described above, according to the first alternative embodiment, because the operation characteristic of each intake valve 118 is changeable in two steps, it is possible to reduce a time that is required to adapt control parameters for controlling the operating state of the engine 100. In addition, it is possible to reduce torque that is required of the actuator for changing the operation characteristic of each intake valve 118, so it is possible to reduce the size and weight of the actuator. The manufacturing cost of the actuator can also be reduced.

Figure 16:
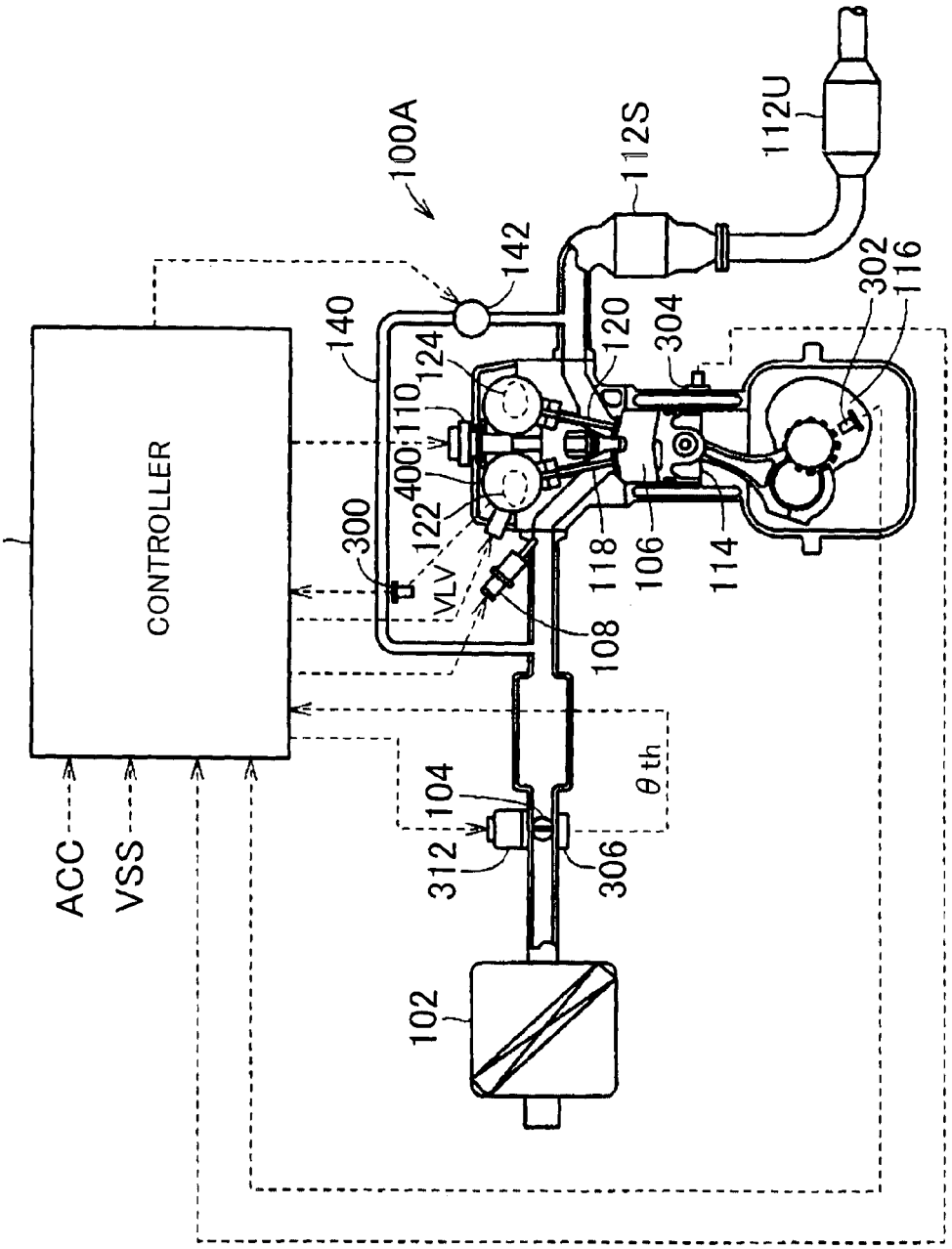
FIG. 16 is a configuration view of an engine according to a second embodiment.

FIG. 16 is a configuration view of an engine according to a second embodiment. As shown in FIG. 16, the engine 100A differs from the configuration of the engine 100 shown in FIG. 2 in that an exhaust gas recirculation (EGR) device is further included.

The EGR device includes an EGR passage 140 and an EGR valve 142. The EGR passage 140 is a pipe for circulating exhaust gas from the engine 100A to an intake side (for example, an intake manifold) of the engine 100A. The EGR valve 142 is provided in the EGR passage 140, and its open/closed state is controlled by the controller 200. When the EGR valve 142 is opened, an exhaust passage and an intake passage are communicated with each other by the EGR passage 140. When the EGR valve 142 is closed, the EGR passage 140 is interrupted. A throttle loss is reduced by circulating exhaust gas to the intake passage by opening the EGR valve 142, with the result that a pumping loss is reduced. Thus, it is possible to improve fuel economy by operating the EGR device (opening the EGR valve 142).

The other configuration of the engine 100A is the same as the engine 100 shown in FIG. 2. The overall configuration of the hybrid vehicle according to the second embodiment is also the same as that of the hybrid vehicle 1 shown in FIG. 1.

In the second embodiment, for the purpose of further improvement in fuel economy during the catalyst warm-up control, when the purification rate of the S/C catalyst 112S increases to some extent during the second warm-up control, the EGR device is operated. During the second warm-up control, the engine 100A is operated at the second operating point and does not need to respond to the traveling power, so some slow combustion caused by the operation of the EGR device is allowed. In this respect, during the second warm-up control, the operation of the EGR device is easily allowed. However, when the EGR device is operated in a state where the combustion temperature of the engine 100A is not sufficiently high, the combustion state deteriorates and emissions deteriorate. Therefore, in the second embodiment, in order to suppress deterioration of emissions due to the operation of the EGR device, when the operation characteristic of each intake valve 118, set by the VVL device 400, is the large cam characteristic during operation of the EGR device, the combustion state is improved by changing the operation characteristic to the intermediate cam characteristic. Thus, it is possible to suppress deterioration of emissions due to the operation of the EGR device while achieving improvement in fuel economy resulting from the operation of the EGR device.

FIG. 17 is a waveform chart for illustrating a controlled state of the engine 100A according to the second embodiment. FIG. 17 is shown in correspondence with FIG. 10. As shown in FIG. 17, until time t3, the waveforms are the same as the waveforms shown in FIG. 10. At this timing, the EGR device is in a stopped state (the EGR valve 142 is closed).

After the operation characteristic of each intake valve 118 is set to the large cam characteristic at time t3 during the second warm-up control, when it is determined at time t5 that the center purification rate of the S/C catalyst 112S has increased to a predetermined level as a result of the fact that the catalyst temperature reaches a predetermined temperature, the EGR device (FIG. 16) is placed in an operated state (the EGR valve 142 is opened). With the operation of the EGR device, the operation characteristic of each intake valve 118 is changed from the large cam characteristic to the intermediate cam characteristic. Ordinary control after the center purification rate of the S/C catalyst 112S has reached 100% at time t4 is the same as that of the first embodiment.

Figure 18A:
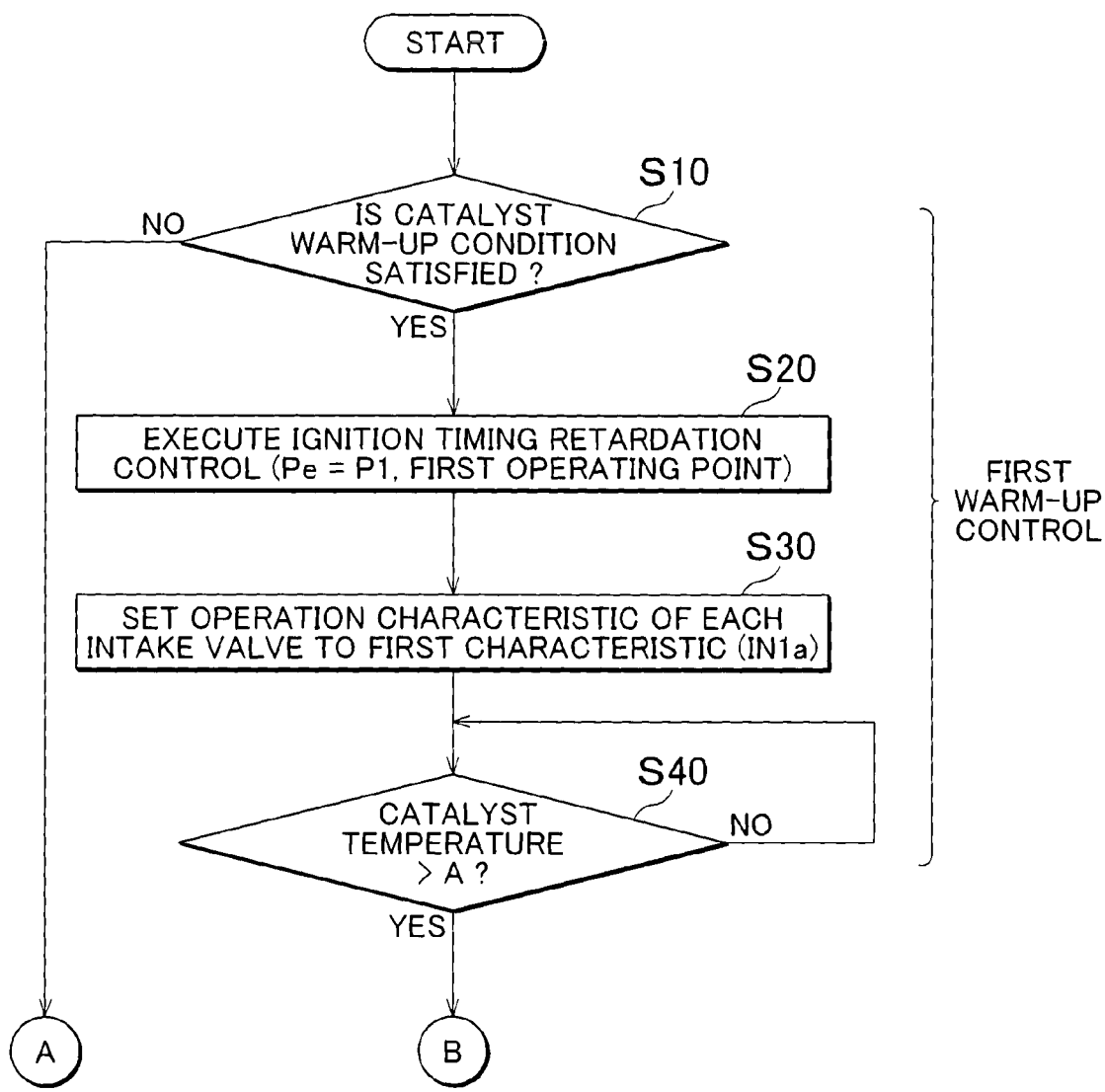
FIG. 18 is a flowchart that illustrates the control structure of catalyst warm-up control and intake valve control in the hybrid vehicle according to the second embodiment.
Figure 18B:
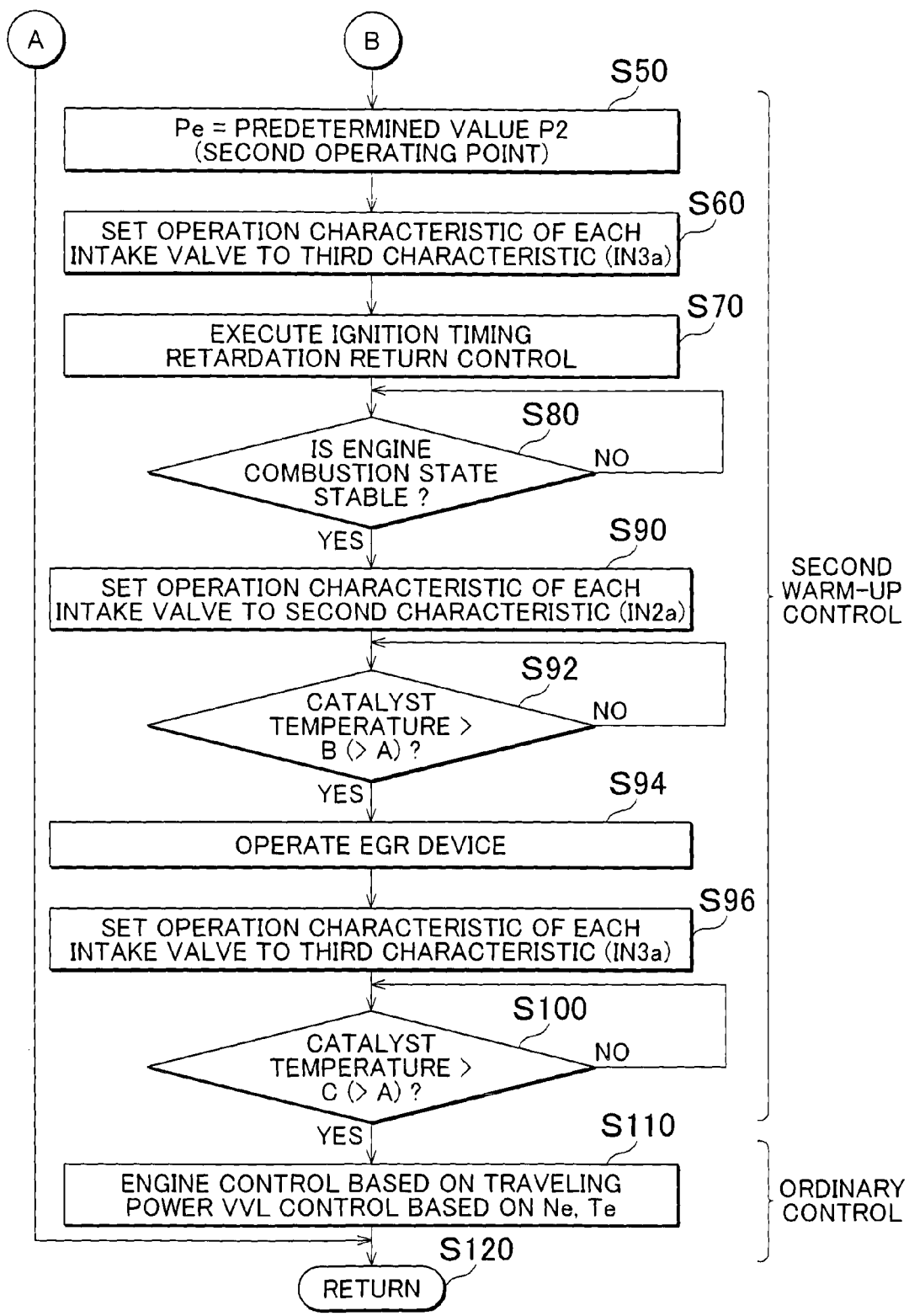

FIG. 18 is a flowchart that illustrates the control structure of catalyst warm-up control and intake valve control in the hybrid vehicle according to the second embodiment. This flowchart is also implemented by the controller 200 executing a prestored program at predetermined intervals. Alternatively, the processes of part of the steps may be implemented by constructing exclusive hardware (electronic circuit).

As shown in FIG. 18, this flowchart differs from the flowchart shown in FIG. 12 in that step S92, step S94 and step S96 are further included. That is, when the operation characteristic of each intake valve 118 is set to the second characteristic (IN2*a*), that is, the large cam characteristic, in step S90, the controller 200 determines whether the temperature of the S/C catalyst 112S exceeds a predetermined value B (>predetermined value A) (step S92). The predetermined value B is the temperature of the S/C catalyst 112S for determining that the center purification rate of the S/C catalyst 112S has increased to such an extent that it is possible to purify exhaust gas even when the EGR device is operated, and is obtained in advance by an experiment, or the like.

When it is determined that the temperature of the S/C catalyst 112S exceeds the predetermined value B (YES in step S92), the controller 200 operates the EGR device by opening the EGR valve 142 (step S94). In addition, the controller 200 sets the operation characteristic of each intake valve 118 to the third characteristic (IN3*a*), that is, the intermediate cam characteristic (step S96). Thus, it is possible to suppress deterioration of emissions due to the operation of the EGR device while achieving improvement in fuel economy resulting from the operation of the EGR device. The other processes are the same as those of the flowchart shown in FIG. 12.

In the above description, when the EGR device is operated, the operation characteristic of each intake valve 118 is changed from the large cam characteristic to the intermediate cam characteristic. Instead, the operation characteristic of each intake valve 118 may be changed in response to an EGR rate. For example, the operation characteristic may be set to the intermediate cam characteristic as described above when the EGR rate is low, and may be set to the small cam characteristic when the EGR rate is high because combustion can become instable. The EGR rate is the ratio of the amount of exhaust gas to the amount of gas flowing into the cylinder, and is, actually, calculated from the engine rotation speed Ne, the intake air amount, the opening degree of the EGR valve 142, and the like.

The EGR device may be operated after the operation characteristic of each intake valve 118 is changed from the large cam characteristic to the intermediate cam characteristic. This is to operate the EGR device after the operation characteristic of each intake valve 118 is set to a state where the EGR device is operable.

As described above, according to the second embodiment, the EGR device is operated during execution of the second warm-up control, so it is possible to further improve fuel economy during the catalyst warm-up control. In addition, when the operation characteristic of each intake valve 118 is the large cam characteristic at the time when the EGR device is operated, the combustion state of the engine 100 deteriorates and, as a result, emissions can deteriorate. However, according to the second embodiment, because the operation characteristic of each intake valve 118 is changed to the intermediate cam characteristic (or the small cam characteristic) in such a case, it is possible to suppress deterioration of emissions while obtaining the effect of improving fuel economy owing to the operation of the EGR device.

In the above-described second embodiment as well, as well as the above-described first alternative embodiment, the operation characteristic of each intake valve 118 may be changeable in two steps. The correlation between a crank angle and a valve displacement that is achieved by the VVL device 400A that is able to change the operation characteristic of each intake valve 118 in two steps is as described with reference to FIG. 13.

FIG. 19 is a waveform chart for illustrating a controlled state of the engine 100 according to a second alternative embodiment. FIG. 19 is shown in correspondence with FIG. 17. As shown in FIG. 19, in the second alternative embodiment, even when the second warm-up control is started at time t2, the operation characteristic of each intake valve 118 is kept at the small cam characteristic (IN1*a* in FIG. 6).

When the combustion state of the engine 100 becomes stable at time t3, the operation characteristic of each intake valve 118 is changed from the small cam characteristic to the large cam characteristic (IN2a in FIG. 6).

When it is determined at time t5 that the center purification rate of the S/C catalyst 112S has increased to a predetermined level as a result of the fact that the catalyst temperature reaches a predetermined temperature, the EGR device (FIG. 16) is placed in the operated state (the EGR valve 142 is opened). With the operation of the EGR device, the operation characteristic of each intake valve 118 is changed from the large cam characteristic to the small cam characteristic. Thus, it is possible to suppress deterioration of emissions due to the operation of the EGR device while achieving improvement in fuel economy resulting from the operation of the EGR device. Ordinary control after the center purification rate of the S/C catalyst 112S has reached 100% at time t4 is the same as that of the second embodiment.

Figure 20A:
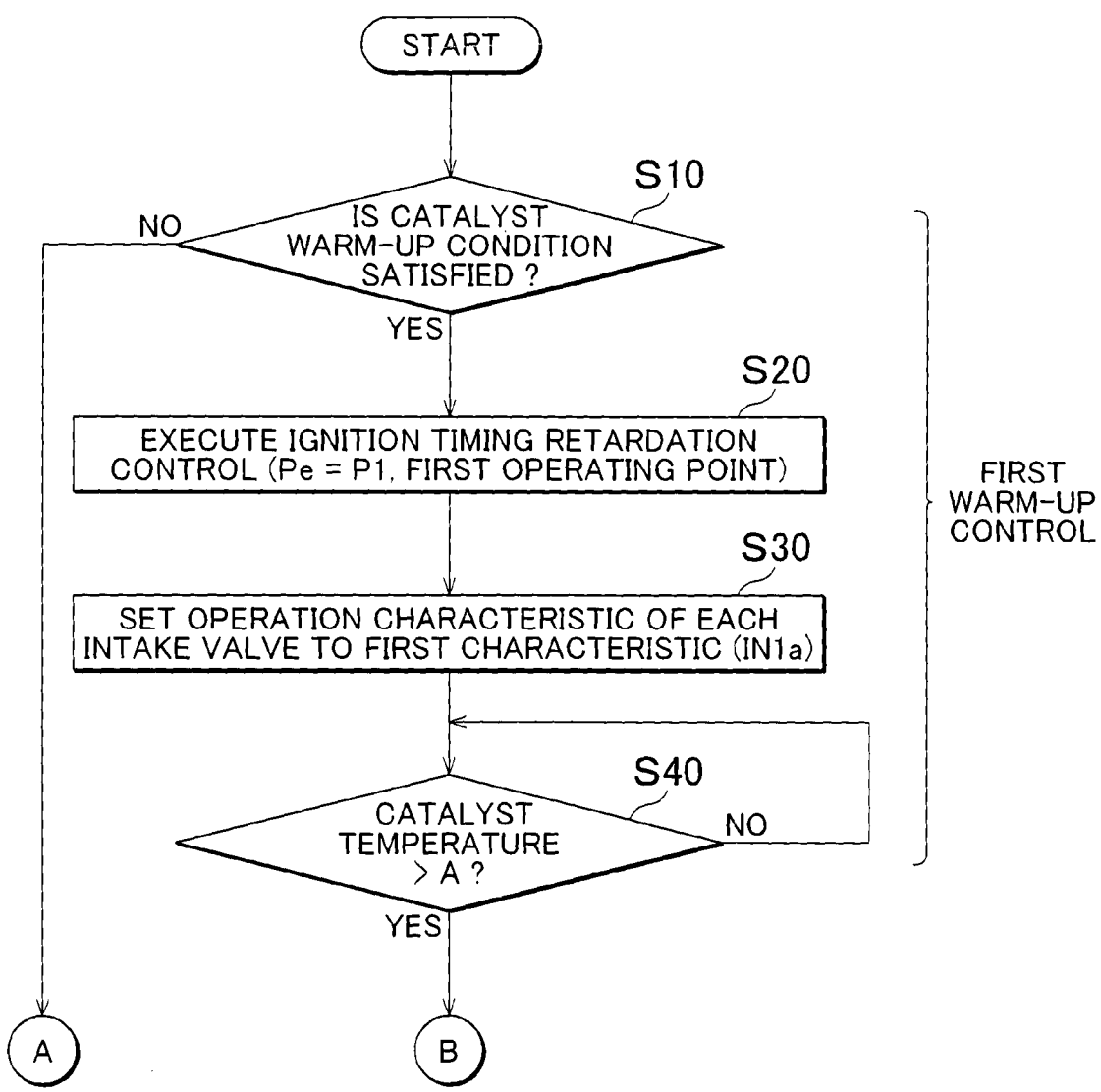
FIG. 20 is a flowchart that illustrates the control structure of catalyst warm-up control and intake valve control in the hybrid vehicle according to the second alternative embodiment.
Figure 20B:
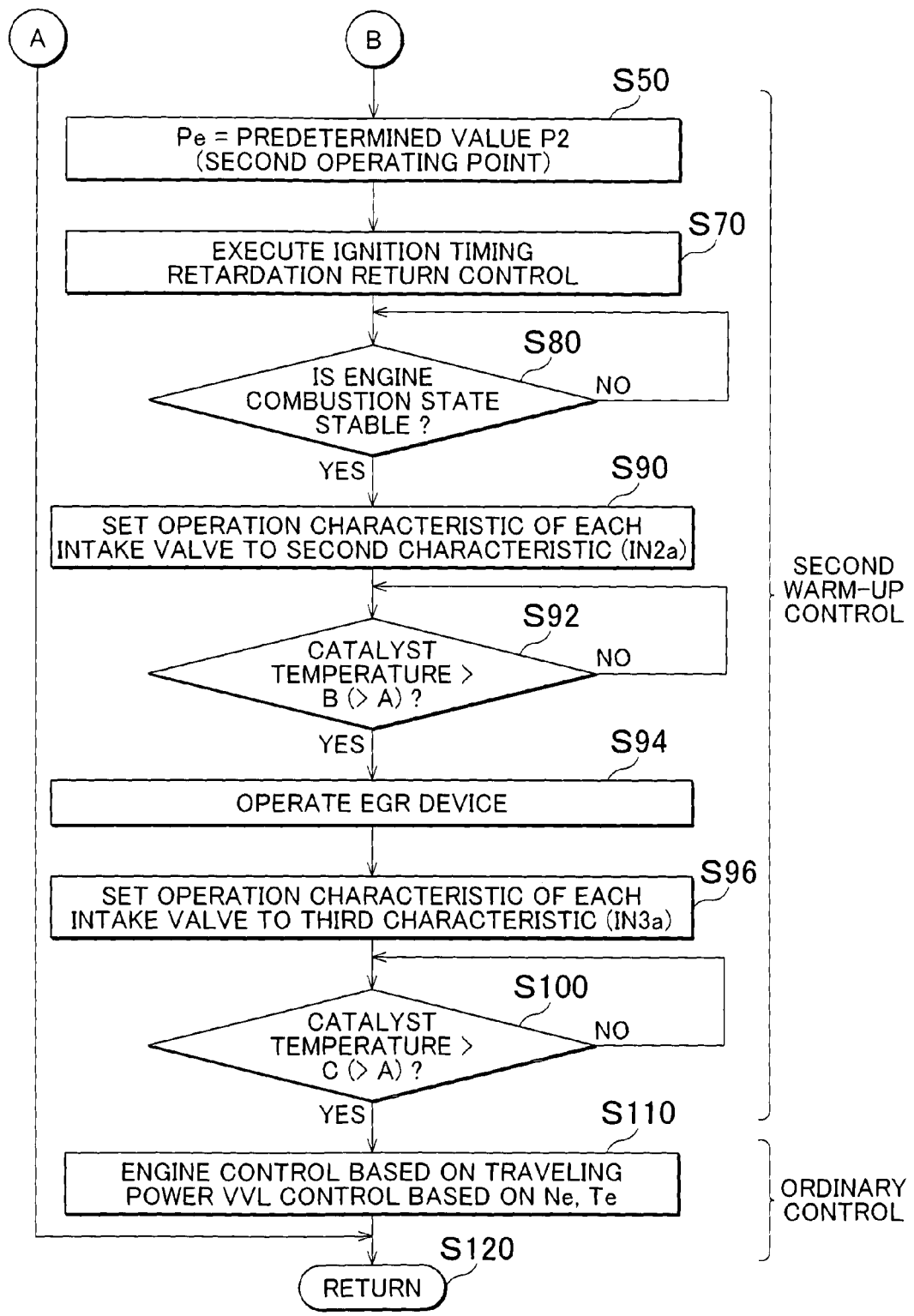

FIG. 20 is a flowchart that illustrates the control structure of catalyst warm-up control and intake valve control in the hybrid vehicle 1 according to the second alternative embodiment. As shown in FIG. 20, the flowchart is formed of a configuration that does not include step S60 in the flowchart shown in FIG. 18. The description of control in the case where step S60 is not included overlaps with the description of the first alternative embodiment shown in FIG. 15, so the description will not be repeated.

As described above, according to the second alternative embodiment, because the operation characteristic of each intake valve 118 is changeable in two steps, similar advantageous effects to those of the first alternative embodiment are obtained.

In the above-described embodiments and alternative embodiments, after it is determined that the combustion state of the engine 100 becomes stable during the second warm-up control, the operation characteristic of each intake valve 118 is set to the second characteristic (IN2a), that is, the large cam characteristic. Instead, a condition that the operation characteristic of each intake valve 118 is settable to the large cam characteristic during the second warm-up control can employ various conditions instead of the combustion state of the engine 100.

For example, after the temperature of the S/C catalyst 112S has increased to a predetermined temperature, the operation characteristic of each intake valve 118 may be set to the large cam characteristic. Alternatively, after the engine power Pe is changed from the first operating power P1 to the second operating power P2 and becomes a constant value with a change from the first warm-up control to the second warm-up control, the operation characteristic of each intake valve 118 may be set to the large cam characteristic. Alternatively, after completion of return of the ignition timing aop of the engine 100 with a change from the first warm-up control to the second warm-up control, the operation characteristic of each intake valve 118 may be set to the large cam characteristic. Alternatively, after a change from the first warm-up control to the second warm-up control, the operation characteristic of each intake valve 118 may be set to the large cam characteristic.

In the above description, the exhaust emission control device is formed of the upstream S/C catalyst 112S and the downstream U/F catalyst 112U (FIG. 2, FIG. 16), and, for the S/C catalyst 112S, when the end face purification rate of the S/C catalyst 112S reaches 100%, the catalyst warm-up control shifts from the first warm-up control to the second warm-up control, and, when the center purification rate of the S/C catalyst 112S reaches 100%, the control mode changes from the catalyst warm-up control (second warm-up control) to the ordinary control.

Instead of such a configuration, when the purification rate (center purification rate) of the upstream S/C catalyst 112S reaches 100%, the catalyst warm-up control may shift from the first warm-up control to the second warm-up control, and, when the purification rate (center purification rate) of the downstream U/F catalyst 112U reaches 100%, the control mode may change from the catalyst warm-up control (second warm-up control) to the ordinary control.

Figure 21:
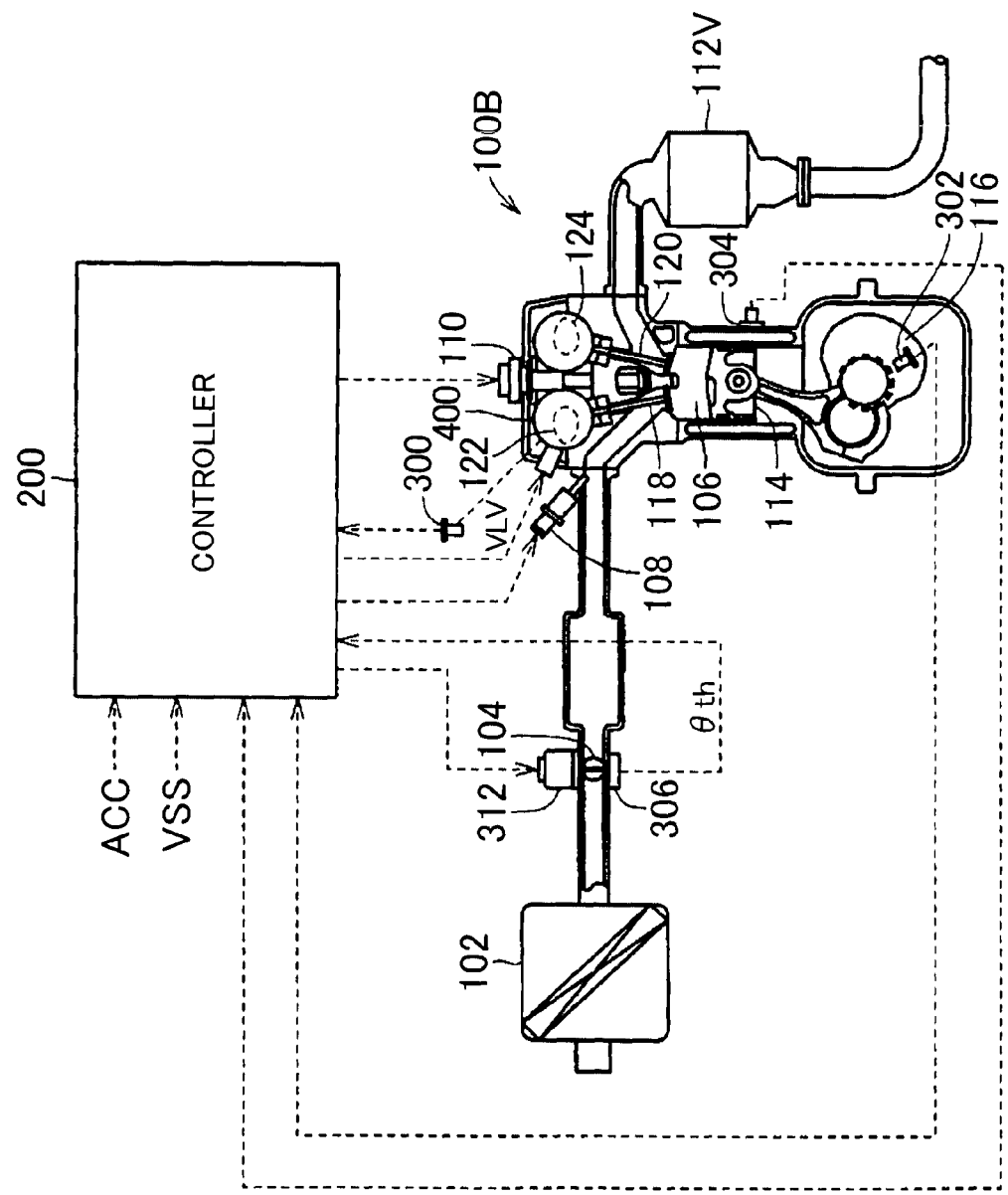
FIG. 21 is another configuration view of an engine.

Alternatively, as shown in FIG. 21, the exhaust emission control device may be formed of a single catalyst 112V without being separated into the S/C catalyst 112S and the U/F catalyst 112U, the catalyst warm-up control may shift from the first warm-up control to the second warm-up control when the end face purification rate of the catalyst 112V reaches 100%, and the control mode may change from the catalyst warm-up control (second warm-up control) to the ordinary control when the center purification rate of the catalyst 112V reaches 100%.

Although not specifically shown in the drawing, the operation characteristic of each intake valve 118 may be changeable continuously (steplessly), and, for example, the operation characteristic of each intake valve 118 during the second warm-up control may be continuously changed from the small cam characteristic to the large cam characteristic.

In the above description, the valve operating angle of each intake valve 118 is changed together with the valve lift of each intake valve 118. However, the invention is also applicable to a hybrid vehicle including an engine that includes a variable valve actuating device that is able to change one of the valve lift of each intake valve 118 and the valve operating angle of each intake valve 118. With the variable valve actuating device that is able to change one of the valve lift and valve operating angle of each intake valve 118 as well, it is possible to obtain similar advantageous effects to those of the case where it is possible to change both the valve lift and valve operating angle of each intake valve 118. The variable valve actuating device that is able to change one of the valve lift and valve operating angle of each intake valve 118 may be implemented by utilizing various known techniques.

In the above-described embodiments, the controller 200 controls the power of the engine 100 for the output of the engine 100 (controls the power to the first or second operating power). Instead, the controller 200 may control the torque of the engine 100 (torque demand control). That is, the controller 200 may operate the engine 100 in the first warm-up control such that the engine 100 outputs a first torque, and may operate the engine 100 in the second warm-up control such that the engine 100 outputs a second torque (second torque>first torque). In this case, in the first warm-up control, the first operating point is set such that the torque of the engine 100 becomes the first torque, and, in the second warm-up control, the second operating point is set such that the torque of the engine 100 becomes the second torque.

In the above description, the series-parallel hybrid vehicle that is able to transmit the power of the engine 100 by distributing the power of the engine 100 to the drive wheels 6 and the motor generators MG1, MG2 by the power split device 4. The invention is also applicable to a hybrid vehicle of another type. That is, the invention is also applicable to, for example, a so-called series hybrid vehicle in which the engine 100 is only used to drive the motor generator MG1 and the driving force of the vehicle is generated only by the motor generator MG2, a hybrid vehicle in which only regenerative energy within kinetic energy generated by the engine 100 is recovered as electric energy, a motor-assist hybrid vehicle in which the engine is used as a main power source and a motor, where necessary, assists, or the like. The invention is also applicable to a hybrid vehicle that travels only by using the power of the engine while the motor is separated.

In the above description, the motor generator MG2 is one example of an "electric motor" according to the invention, and the engines 100, 100A correspond to one example of an "internal combustion engine" according to the invention. The VVL device 400 corresponds to one example of a "variable valve actuating device" according to the invention. The EGR device corresponds to one example of a "circulation device" according to the invention.

The embodiments described above are expected to be implemented in appropriate combinations. The embodiments described above should be regarded as only illustrative in every respect and not restrictive. The scope of the invention is defined by the appended claims rather than the description of the above embodiments. The scope of the invention is intended to encompass all modifications within the scope of the appended claims and equivalents thereof.

The invention claimed is:

1. A hybrid vehicle comprising:
an electric motor configured to generate a vehicle driving force;
an internal combustion engine including a variable valve actuating device, the variable valve actuating device being configured to change an operation characteristic of an intake valve to one of a first characteristic and a second characteristic, at least one of a valve lift or valve operating angle of the intake valve at the time when the operation characteristic is the second characteristic is larger than the corresponding at least one of the valve lift or valve operating angle of the intake valve at the time when the operation characteristic is the first characteristic;
an exhaust emission control device configured to purify exhaust gas from the internal combustion engine with use of a catalyst; and
a controller configured to
(a) execute catalyst warm-up control, the catalyst warm-up control being control for warming up the catalyst of the exhaust emission control device, the catalyst warm-up control including a first control and a second control, the first control being control for operating the internal combustion engine at a first operating point, the second control being control for, after the first control is executed, operating the internal combustion engine at a second operating point irrespective of a driving force that is required to propel the hybrid vehicle, an output of the internal combustion engine at the second operating point being larger than an output of the internal combustion engine at the first operation point,
(b) operate the internal combustion engine while an ignition timing of the internal combustion engine at the time when the first control is executed is set to a retarded side than an ignition timing of the internal combustion engine at the time when the second control is executed,
(c) when the first control is executed, control the variable valve actuating device such that the operation characteristic becomes the first characteristic,
(d) when the second control is executed, control the variable valve actuating device such that the operation characteristic is changed to the second characteristic, and
(e) after the second control is executed, operate the internal combustion engine based on the driving force that is required to propel the hybrid vehicle, and control the variable valve actuating device based on a rotation speed and torque of the internal combustion engine.

2. The hybrid vehicle according to claim 1, wherein
the internal combustion engine includes a circulation device, the circulation device is configured to circulate exhaust gas from the internal combustion engine to an intake side, and
the controller is configured to, when the second control is executed, operate the circulation device.

3. The hybrid vehicle according to claim 2, wherein
the controller is configured to, when the second control is executed, when the circulation device is operated and when the operation characteristic is the second characteristic, control the variable valve actuating device such that at least one of the valve lift or the valve operating angle decreases.

4. The hybrid vehicle according to claim 3, wherein
the variable valve actuating device is configured to selectively change the operation characteristic to any one of the first characteristic, the second characteristic and a third characteristic, at least one of the valve lift or the valve operating angle at the time when the operation characteristic is the third characteristic is larger than the corresponding at least one of the valve lift or the valve operating angle at the time when the operation characteristic is the first characteristic, at least one of the valve lift or the valve operating angle at the time when the operation characteristic is the third characteristic is smaller than the corresponding at least one of the valve lift or the valve operating angle at the time when the operation characteristic is the second characteristic,
the controller is configured to, when execution of the second control is started, control the variable valve actuating device such that the operation characteristic is changed to the third characteristic,
the controller is configured to, when the second control is executed, control the variable valve actuating device such that the operation characteristic is changed to the second characteristic, and
the controller is configured to, when the circulation device is operated and the operation characteristic is the second characteristic, control the variable valve actuating device such that the operation characteristic is changed to the third characteristic, and operate the circulation device.

5. The hybrid vehicle according to claim 1, wherein
the variable valve actuating device is configured to selectively change the operation characteristic to any one of the first characteristic, the second characteristic and a third characteristic, at least one of the valve lift or the valve operating angle at the time when the operation characteristic is the third characteristic is larger than the corresponding at least one of the valve lift or the valve operating angle at the time when the operation characteristic is the first characteristic, at least one of the valve lift or the valve operating angle at the time when the operation characteristic is the third characteristic is smaller than the corresponding at least one of the valve lift or the valve operating angle at the time when the operation characteristic is the second characteristic, the controller is configured to, when execution of the second control is started, control the variable valve actuating device such that the operation characteristic is changed to the third characteristic, and the controller is configured to, when the second control is executed, control the variable valve actuating device such that the operation characteristic is changed to the second characteristic.

6. The hybrid vehicle according to claim 1, wherein the variable valve actuating device is configured to selectively change the operation characteristic to one of the first characteristic and the second characteristic, and the controller is configured to, before execution of the second control completes, control the variable valve actuating device such that the operation characteristic is changed to the second characteristic.

7. The hybrid vehicle according to claim 1, wherein the first control is control for warming up an exhaust gas upstream side of the catalyst, and the second control is control for warming up the entire catalyst.

8. The hybrid vehicle according to claim 1, wherein the controller is configured to, when any one of a first execution condition to a fifth execution condition is satisfied, control the variable valve actuating device such that the operation characteristic is changed to the second characteristic, the first execution condition is satisfied after execution of the second control is started, the second execution condition is satisfied after completion of return of the ignition timing resulting from a change from the first control to the second control, the third execution condition is satisfied after completion of a change of the operating point from the first operating point to the second operating point, the fourth execution condition is satisfied when a temperature of the exhaust emission control device has increased to a predetermined temperature, and the fifth execution condition is satisfied after it is determined that a combustion state of the internal combustion engine becomes stable.

9. The hybrid vehicle according to claim 1, wherein the controller is configured to, when the first control and the second control are executed, control the electric motor such that the electric motor outputs the driving force that is required to propel the hybrid vehicle.

10. A controller for a hybrid vehicle, the hybrid vehicle including an electric motor, an internal combustion engine and an exhaust emission control device, the electric motor being configured to generate a vehicle driving force, the internal combustion engine including a variable valve actuating device, the variable valve actuating device being configured to change an operation characteristic of an intake valve to one of a first characteristic and a second characteristic, at least one of a valve lift or valve operating angle of the intake valve at the time when the operation characteristic is the second characteristic being larger than the corresponding at least one of the valve lift or valve operating angle of the intake valve at the time when the operation characteristic is the first characteristic, the exhaust emission control device being configured to purify exhaust gas from the internal combustion engine with the use of a catalyst, the controller comprising:

first warm-up control means for operating the internal combustion engine at a first operating point, operating the internal combustion engine while an ignition timing of the internal combustion engine at the time when the internal combustion engine is operated at the first operating point is controlled to a retarded side than an ignition timing of the internal combustion engine at the time when the internal combustion engine is operated at a second operating point, and controlling the variable valve actuating device such that the operation characteristic becomes the first characteristic;

second warm-up control means for operating the internal combustion engine at the second operating point, and controlling the variable valve actuating device such that the operation characteristic is changed to the second characteristic; and ordinary control means for after the control is executed by the second warm-up control means, operating the internal combustion engine based on a driving force that is required to propel the hybrid vehicle and controlling the variable valve actuating device based on a rotation speed and torque of the internal combustion engine, an output of the internal combustion engine at the second operating point being larger than an output of the internal combustion engine at the first operating point.

11. A control method for a hybrid vehicle, the hybrid vehicle including an electric motor, an internal combustion engine, an exhaust emission control device and a controller, the electric motor being configured to generate a vehicle driving force, the internal combustion engine including a variable valve actuating device, the variable valve actuating device being configured to change an operation characteristic of an intake valve to one of a first characteristic and a second characteristic, at least one of a valve lift or valve operating angle of the intake valve at the time when the operation characteristic is the second characteristic being larger than the corresponding at least one of the valve lift or valve operating angle of the intake valve at the time when the operation characteristic is the first characteristic, the exhaust emission control device being configured to purify exhaust gas from the internal combustion engine with use of a catalyst, the control method comprising:

executing first warm-up control by the controller, the first warm-up control being control for operating the internal combustion engine at a first operating point and operating the internal combustion engine while an ignition timing of the internal combustion engine at the time when the internal combustion engine is operated at the first operating point is controlled to a retarded side than an ignition timing of the internal combustion engine at the time when the internal combustion engine is operated at a second operating point;

executing second warm-up control by the controller, the second warm-up control being control for operating the internal combustion engine at the second operating point and controlling the variable valve actuating device such that the operation characteristic is changed to the second characteristic; and executing ordinary control by the controller, the ordinary control being control for, after the second warm-up control is executed, operating the internal combustion engine based on a driving force that is required to propel the hybrid vehicle and controlling the variable valve actuating device based on a rotation speed and torque of the internal combustion engine, an output of the internal combustion engine at the second operating point being larger than an output of the internal combustion engine at the first operating point.

* * * * *